(12) United States Patent
Yoshitomi et al.

(10) Patent No.: US 11,954,272 B2
(45) Date of Patent: Apr. 9, 2024

(54) INFORMATION PROCESSING DEVICE, INFORMATION PROCESSING SYSTEM AND CONTROLLING METHOD

(71) Applicant: Lenovo (Singapore) Pte. Ltd., Singapore (SG)

(72) Inventors: Keiichi Yoshitomi, Kanagawa (JP); Yoshitsugu Suzuki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/297,002

(22) Filed: Apr. 7, 2023

(65) Prior Publication Data

US 2023/0376128 A1    Nov. 23, 2023

(30) Foreign Application Priority Data

May 19, 2022  (JP) ................................. 2022-082034

(51) Int. Cl.
*G06F 3/0354* (2013.01)

(52) U.S. Cl.
CPC ................. *G06F 3/03545* (2013.01); *G06F 2203/04108* (2013.01)

(58) Field of Classification Search
None
See application file for complete search history.

(56) References Cited

U.S. PATENT DOCUMENTS

| 11,829,524 | B2* | 11/2023 | Elhadad ................. G06F 3/017 |
| 2014/0189602 | A1 | 7/2014 | Wang et al. |
| 2016/0342258 | A1 | 11/2016 | Han et al. |
| 2020/0150820 | A1 | 5/2020 | Wang |
| 2020/0333994 | A1* | 10/2020 | Sepulveda ............ G06F 3/0488 |

FOREIGN PATENT DOCUMENTS

| JP | 2013-218468 A | 10/2013 |
| JP | 2015-170879 A | 9/2015 |
| JP | 2015-172861 A | 10/2015 |
| JP | 2017-510868 A | 4/2017 |
| JP | 2020-527809 A | 9/2020 |
| JP | 2021-051766 A | 4/2021 |
| WO | 2015/112405 A1 | 7/2015 |

* cited by examiner

*Primary Examiner* — Stephen T. Reed
(74) *Attorney, Agent, or Firm* — Osha Bergman Watanabe & Burton LLP

(57) ABSTRACT

An information processing device includes a first display, a touch sensor on a screen of the first display detects a position of an object on the screen and detects approach of a pen within a distance above the screen, a pen input processing acquires a position of the pen on the screen by switching between a first input mode for displaying a movement locus of the pen on the screen based on the position of the pen and a second input mode for making a second display sets to a specific arrangement relation with the first display displays the movement locus of the pen and an input switch processing which switches between the first input mode and the second input mode alternately in accordance with a movement of the pen performed in a non-contact state based on the specific arrangement relation after detection of the pen.

6 Claims, 11 Drawing Sheets

| SCREEN EDGE | INPUT SWITCH |
|---|---|
| RIGHT-SIDE EDGE | PEN INPUT ON TABLET SCREEN |
| LEFT-SIDE EDGE | PEN INPUT ON LAPTOP PC SCREEN |
| UPPER-SIDE EDGE | NO INPUT SWITCH |
| LOWER-SIDE EDGE | NO INPUT SWITCH |
FIG. 5
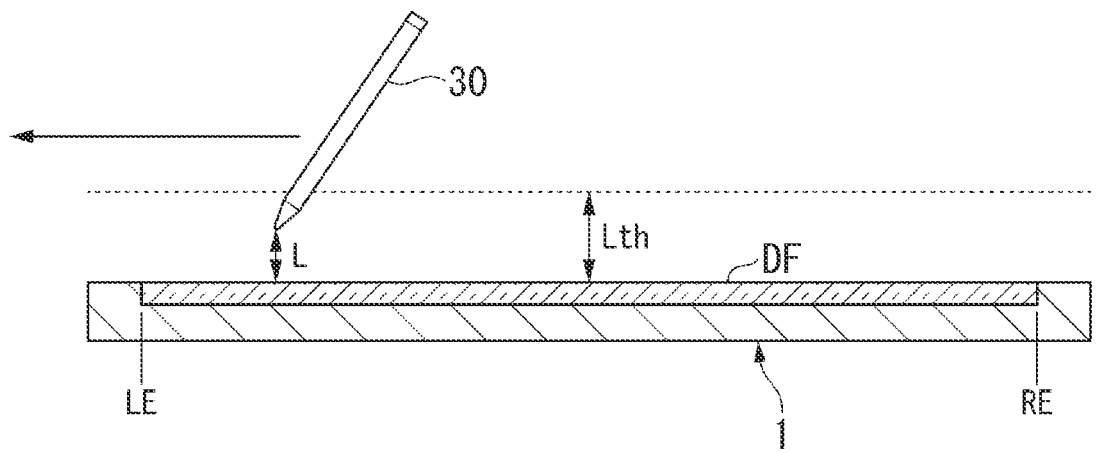
FIG. 6
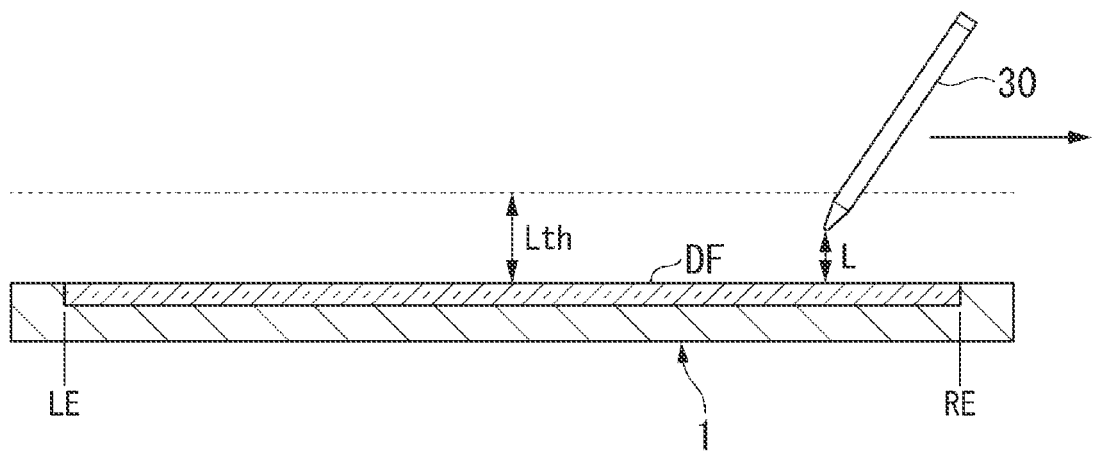
FIG. 7

INFORMATION PROCESSING DEVICE, INFORMATION PROCESSING SYSTEM AND CONTROLLING METHOD

CROSS-REFERENCE TO RELATED APPLICATIONS

This application claims priority to Japanese Patent Application No. 2022-82034 filed on May 19, 2022, the contents of which are hereby incorporated herein by reference in their entirety.

BACKGROUND OF THE INVENTION

Field of the Invention

The present invention relates to an information processing device, an information processing system and a controlling method.

Description of the Related Art

In recent years, in an information processing device such as a tablet terminal and so forth of the type that a display unit which is used for pen input is installed, the information processing device of the type which is so connected to, for example, an external monitor and a personal computer (PC) as to operate as an extended pen tablet in addition to a pen-input operation that the device performs alone is known (see, for example, Japanese Unexamined Patent Application Publication No. 2021-51766).

For example, in a case where the tablet terminal is operated as the extended pen tablet by connecting the tablet terminal to the PC, it is conceivable to use the tablet terminal and the PC by switching a target screen for pen input between the screen of the PC and the screen of the tablet terminal. However, the prior art has such problems that it is necessary to switch the target screen for the pen input by opening a setting change menu in such a case as above, the usability is low and, consequently, it is not possible for a user to obtain the user experience.

SUMMARY OF THE INVENTION

One or more embodiments of the invention provide the information processing device, the information processing system and the controlling method which make it possible to switch the target screen for the pen input with ease and to improve the user experience.

An information processing device according to one aspect of the present invention includes a first display unit (first display), a touch sensor unit (touch sensor) which is arranged on a screen of the first display unit and which detects a contact position of an object on the screen, and detects approach of a pen which approaches a point which is located within a threshold distance above the screen of the first display unit in a state that the pen is out of contact with the screen and the position of the pen above the screen, a pen input processing section which acquires a contact position of the pen on the screen of the first display unit that the touch sensor unit detects and executes pen input processing by switching between a first pen input mode for making the first display unit display a movement locus of the pen on the screen of the first display unit which is based on the contact position of the pen and a second pen input mode for making a second display unit (second display) which is set to a specific arrangement relation with the first display unit display the movement locus of the pen and an input switch processing section which switches between the first pen input mode and the second pen input mode alternately in accordance with a movement operation of the pen which is performed in a non-contact state which is based on the specific arrangement relation after detection of approach of the pen by the touch sensor unit.

In addition, according to one aspect of the present invention, in the information processing device, an arrangement information storage section which stores arrangement information which indicates an arrangement relation between the first display unit and the second display unit may be further included, in which, in a case where a hovering state that the pen maintains the state of out-of-contact with the screen of the first display unit and a state of approaching the point which is located within the threshold distance for a fixed time period is detected by the touch sensor unit and thereafter in a case where an operation of moving the pen above the screen of the first display unit in a direction of indicating a switching destination screen is detected on the basis of the arrangement information, the input switch processing section may switch to one input mode which corresponds to the screen of the switching destination between the first input mode and the second input mode.

In addition, according to one aspect of the present invention, in the information processing device, a screen size information storage section which stores screen size information which indicates the size of the screen of the second display unit and a coordinates transformation section which transforms coordinates of the pen on the screen of the first display unit to coordinates of the pen on the screen of the second display unit on the basis of the screen size information that the screen size information storage section stores may be included, in which the pen input processing section may make the second display unit display the movement locus of the pen which is based on the coordinates of the pen on the screen of the second display unit that the coordinates transformation section transforms in the second pen input mode.

In addition, according to one aspect of the present invention, in the information processing device, a main control unit (main controller) which executes processing which is based on an OS (Operating System) and an independent built-in control unit (independent built-in controller) which is different from the main control unit may be included, in which the main control unit may include the pen input processing section and the built-in control unit may include the input switch processing section and the coordinates transformation section.

In addition, according to one aspect of the present invention, an information processing system includes a first display unit (first display), a touch sensor unit (touch sensor) which is arranged on a screen of the first display unit and which detects a contact position of an object on the screen, and detects approach of a pen which approaches a point which is located within a threshold distance above the screen of the first display unit in a state that the pen is out of contact with the screen and the position of the pen above the screen, a second display unit (second display) which is set to a specific arrangement relation with the first display unit, a pen input processing section which acquires a contact position of the pen on the screen of the first display unit that the touch sensor unit detects and executes pen input processing by switching between a first pen input mode for making the first display unit display a movement locus of the pen on the screen of the first display unit which is based on the contact position of the pen and a second pen input mode for making the second display unit display the movement locus of the pen and an input switch processing section which switches between the first pen input mode and the second pen input mode alternately in accordance with a movement operation of the pen which is performed in a non-contact state which is based on the specific arrangement relation after detection of approach of the pen by the touch sensor unit.

In addition, according to one aspect of the present invention, in a method of controlling an information processing system which includes a first display unit (first display), a touch sensor unit (touch sensor) which is arranged on a screen of the first display unit and which detects a contact position of an object on the screen, and detects approach of a pen which approaches a point which is located within a threshold distance above the screen of the first display unit in a state that the pen is out of contact with the screen and the position of the pen above the screen and a second display unit (second display) which is set to a specific arrangement relation with the first display unit, the method includes acquiring a contact position of the pen on the screen of the first display unit that the touch sensor unit detects and executing pen-input processing by switching between a first pen input mode for making the first display unit display a movement locus of the pen on the screen of the first display unit which is based on the contact position of the pen and a second pen input mode for making the second display unit display the movement locus of the pen by a pen input processing section and, after detection of the approach of the pen by the touch sensor unit, switching between the first pen input mode and the second pen input mode alternately in accordance with a movement operation of the pen which is performed in a non-contact state which is based on the specific arrangement relation by an input switch processing section.

The above-described aspects of the present invention can perform switching of the target screen for the pen input with ease and can improve the user experience.

BRIEF DESCRIPTION OF THE DRAWINGS

FIG. 5 is a diagram illustrating one example of data in an arrangement information storage unit in the first embodiment.

FIG. 6 is a first diagram illustrating one example of an operation of hovering swipe-out in the first embodiment.

FIG. 7 is a second diagram illustrating one example of the operation of hovering swipe-out in the first embodiment.

DETAILED DESCRIPTION OF THE INVENTION

In the following, an information processing device and an information processing system according to respective embodiments of the present invention will be described with reference to the drawings.

First Embodiment

Figure 1:
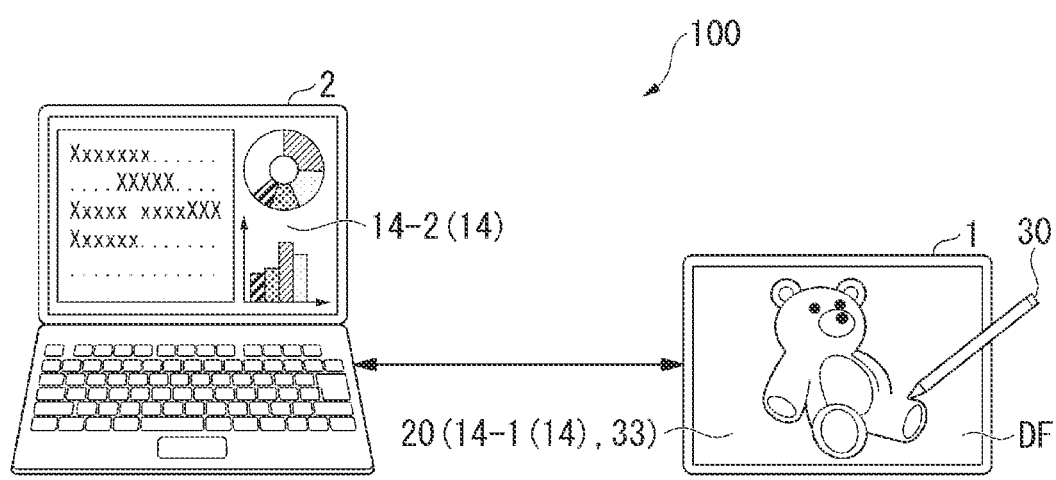
FIG. 1 is an external diagram illustrating one example of an information processing system according to the first embodiment of the present invention.

FIG. 1 is an external diagram illustrating one example of an information processing system 100 according to the first embodiment of the present invention.

As illustrated in FIG. 1, the information processing system 100 includes a tablet terminal 1 and a laptop PC 2. Incidentally, in the first embodiment, the tablet terminal 1 and the laptop PC 2 are examples of the information processing device.

FIG. 1 illustrates one example that the information processing system 100 is configured to connect the tablet terminal 1 to the laptop PC 2 as an extended pen tablet thereby to display images which are different from each other on a display unit (display) 14-1 of the tablet terminal 1 and on a display unit (display) 14-2 of the laptop PC 2.

The tablet terminal 1 includes a touch screen 20, the touch screen 20 includes the display unit 14-1 and a touch sensor unit (touch sensor) 33 and the display unit 14-1 displays various information on a screen DF.

The touch sensor 33 is arranged in a state of being superposed on the display unit 14-1 and thereby it becomes possible for the touch sensor unit 33 to detect a contact position of an object (for example, a user's finger and so forth) on the screen DF of the display unit 14-1, and to detect approach of a pen 30 which approaches a point which is located within a threshold distance above the screen DF of the display unit 14-a in a non-contact state and the position of the pen 30 above the screen DF.

Incidentally, details of the touch screen 20, the display unit 14-1 and the touch sensor unit 33 will be described later.

Next, main hardware constitutional elements of the tablet terminal 1 will be described with reference to FIG. 2.

Figure 2:
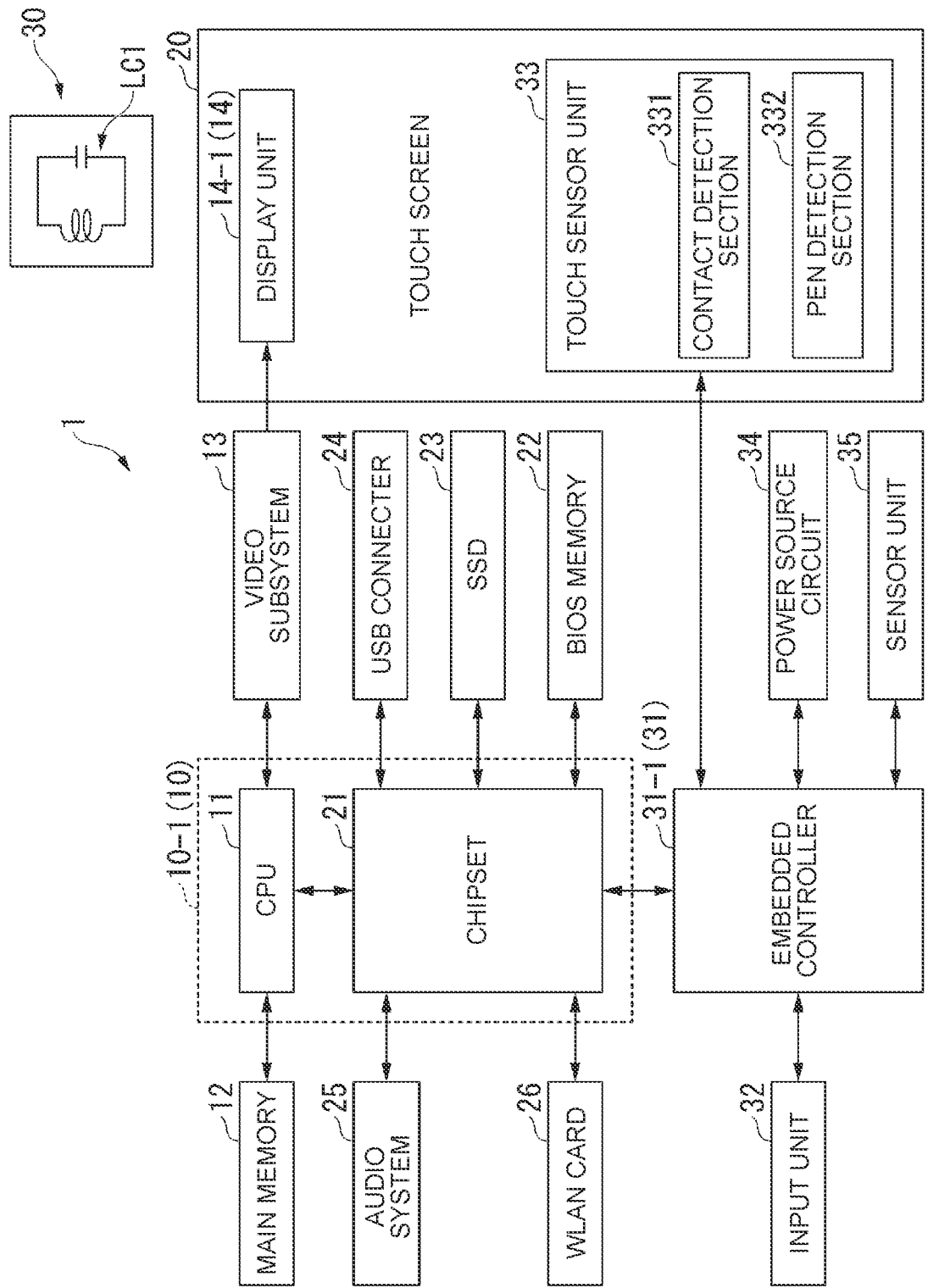
FIG. 2 is a diagram illustrating one example of main hardware constitutional elements of a tablet terminal according to the first embodiment of the present invention.

FIG. 2 is a diagram illustrating one example of the main hardware constitutional elements of the tablet terminal 1 according to the first embodiment. The tablet terminal 1 is a terminal device which is configured on the basis of a laptop PC which loads, for example, Windows (the registered trademark) as an OS (Operating System). The tablet terminal 1 is an information processing device which is usable both in the form of a general laptop PC and in the form of the tablet terminal.

As illustrated in FIG. 2, the tablet terminal 1 includes a CPU (Central Processing Unit) 11, a main memory 12, a video subsystem 13, the display unit 14-1, a chipset 21, a BIOS (Basic Input Output System) memory 22, an SSD (Solid State Device) 23, a USB (Universal Serial Bus) connector 24, an audio system 25, a WLAN (Wireless Local Area Network) card 26, the pen 30, an embedded controller 31, an input unit 32, a touch sensor unit (touch sensor) 33, a power source circuit 34 and a sensor unit (sensor) 35.

The CPU 11 executes various arithmetic processing by a program control system and controls the entire operation of the tablet terminal 1.

The main memory 12 is a writable memory which is utilized as an area that an execution program of the CPU 11 is read in or as a work area that processed data on the execution program is written. The main memory 12 is configured by, for example, a plurality of DRAM (Dynamic Random Access Memory) chips. The execution program includes the OS, various device drivers which are used for operating peripherals in hardware, various services/utilities, an application program (application software) and so forth.

The video subsystem 13 is adapted to realize a function which relates to image display and includes a video controller. The video controller processes picture description instructions which are issued from the CPU 11 and writes processed picture description information into a video memory and, in addition, reads the processed picture description information out of the video memory and outputs the read-out processed picture description information to the display unit 14-1 as picture description data (display data).

The display unit 14-1 (14) is, for example, a liquid crystal display, an organic EL (Electro-Luminescence) display and so forth and displays a display screen which is based on the picture description data (the display data) which is output from the video subsystem 13. As illustrated in FIG. 1, the display unit 14-1 is configured as a part of the touch screen 20.

The chipset 21 includes controllers for the USB, a serial ATA (Advanced Technology Attachment) interface, an SPI (Serial Peripheral Interface) bus, a PCI (Peripheral Component Interconnect) bus, a PCI-Express bus, an LPC (Low Pin Count) bus and so forth and various devices are connected to the chipset 21 via these buses and interface. In FIG. 2, as examples of devices, the BIOS memory 22, the SSD 23, the USB connector 24, the audio system 25, the WLAN card 26 and the embedded controller 31 are connected to the chipset 21 via these buses and interface.

The BIOS memory 22 is configured by an electrically rewritable nonvolatile memory, such as, for example, an EEPROM (Electrically Erasable Programmable Read Only Memory), a flash ROM and so forth. The BIOS memory 22 stores the BIOS, system firmware for controlling the operations of the embedded controller 31 and other elements and so forth.

The SSD 23 (one example of the nonvolatile storage device) stores the OS, various drivers, various services/utilities, an application program (in the following, will be called the application in some cases) and various data.

The USB connector 24 is adapted to connect the peripherals which utilize the USB to the chipset 21.

The audio system 25 records, reproduces and outputs sound data.

The WLAN card 26 is connected to a network via a wireless LAN (Local Area Network) cable and performs data communication. For example, in a case where the WLAN card 26 receives data from the network, the WLAN card 26 generates an event trigger which indicates data reception.

The embedded controller 31 is a one-chip microcomputer which monitors and controls operations of various devices (peripheral devices, sensors and so forth) regardless of a system state of the tablet terminal 1. In addition, the embedded controller 31 has a power management function which controls the operation of the power source circuit 34. Incidentally, the embedded controller 31 is configured by not illustrated CPU, ROM, RAM (Random Access Memory) and so forth and includes A/D input terminals, D/A output terminals, timers and digital input and output terminals of a plurality of channels. For example, the input unit 32, the touch sensor unit 33, the power source circuit 34, the sensor unit 35 and so forth are connected to the embedded controller 31 via these input and output terminals and the embedded controller 31 controls operations of the input unit 32, the touch sensor unit 33, the power source circuit 43, the sensor unit 35 and so forth.

The input unit 32 is an input device such as, for example, a power source switch, a keyboard, a pointing device and so forth.

For example, in a case where the touch sensor unit 33 detects that the pen 30 (pen-shape operation medium) approaches the point which is located within the predetermined distance (within the threshold distance) relative to the screen DF of the display unit 14-1 and the pen 30 reaches the point which is located within the predetermined distance relative to the screen DF, it is possible for the touch sensor unit 33 to detect the position of the pen 30 above the screen DF in the non-contact state. That is, it is possible for the touch sensor unit 33 to detect a hovering state that the pen 30 maintains the non-contact state above the screen DF of the display unit 14-1 and a state that the pen 30 approaches the point which is located within the threshold distance for a fixed time period. Incidentally, the touch sensor unit 33 and the display unit 14-1 configure the touch screen 20.

In addition, the touch sensor unit 33 includes a contact detection section 331 and a pen detection section 332. The contact detection section 331 is, for example, a capacitance touch sensor and detects an operation medium (an object such as the pen 30, a finger and so forth) which is in contact with the screen DF of the display unit 14 and detects a position that the operation medium is in contact with the screen DF of the display unit 14.

The pen detection section 332 is, for example, an electromagnetic induction type touch sensor and detects the position of the pen 30 on/above the screen DF of the display unit 14 in a non-contact state by utilizing a resonance circuit LC 1 of the pen 30. It is possible for the pen detection section 332 to detect, for example, that the pen 30 approaches the point which is located within the threshold distance relative to the screen DF of the display unit 14.

It is possible for the touch sensor unit 33 to detect touch input which is attained by contact of the object (for example, the finger and so forth) above the screen DF and pen input which is attained by contact of the pen 30 on the screen DF.

Incidentally, in a case where the pen detection section 332 detects that the pen 30 approaches the point which is located within the threshold distance relative to the screen DF of the display unit 14, the contact detection section 331 detects non-contact of the pen 30 and thereby it becomes possible for the touch sensor unit 33 to detect hovering of the pen 30.

The pen 30 is a pen-shape operation medium and is, for example, a touch pen, a stylus pen and so forth. The pen 30 includes the resonance circuit LC 1. The pen 30 is configured to be supplied with power by electromagnetic induction to a coil of the resonance circuit LC 1 and thereby to make it possible to detect the position of the pen 30 on/above the screen DF of the display unit 14-1 by utilizing the resonance circuit LC 1.

The power source circuit 34 includes, for example, a DC/DC converter, a charge/discharge unit, a battery unit, an AC/DC adapter and so forth and converts a DC voltage which is supplied from the AC/DC adapter or the battery unit to a plurality of voltages of different levels which is utilizable for operating the tablet terminal 1. In addition, the power source circuit 34 supplies the electric power to respective parts of the tablet terminal 1 under the control from the embedded controller 31.

The sensor unit 35 is, for example, an acceleration sensor, a gyro sensor and so forth and detects a screen display orientation which indicates a use state of the tablet terminal 1. The sensor unit 35 detects, for example, a gravitational acceleration orientation and detects the screen display orientation of the tablet terminal 1 (the display unit 14-1).

Incidentally, in the first embodiment of the present invention, the CPU 11 and the chipset 21 correspond to a main control unit 10-1 (10). The main control unit 10-1 (10) executes processing which is based on the OS (for example, Windows (the registered trademark).

Figure 3:
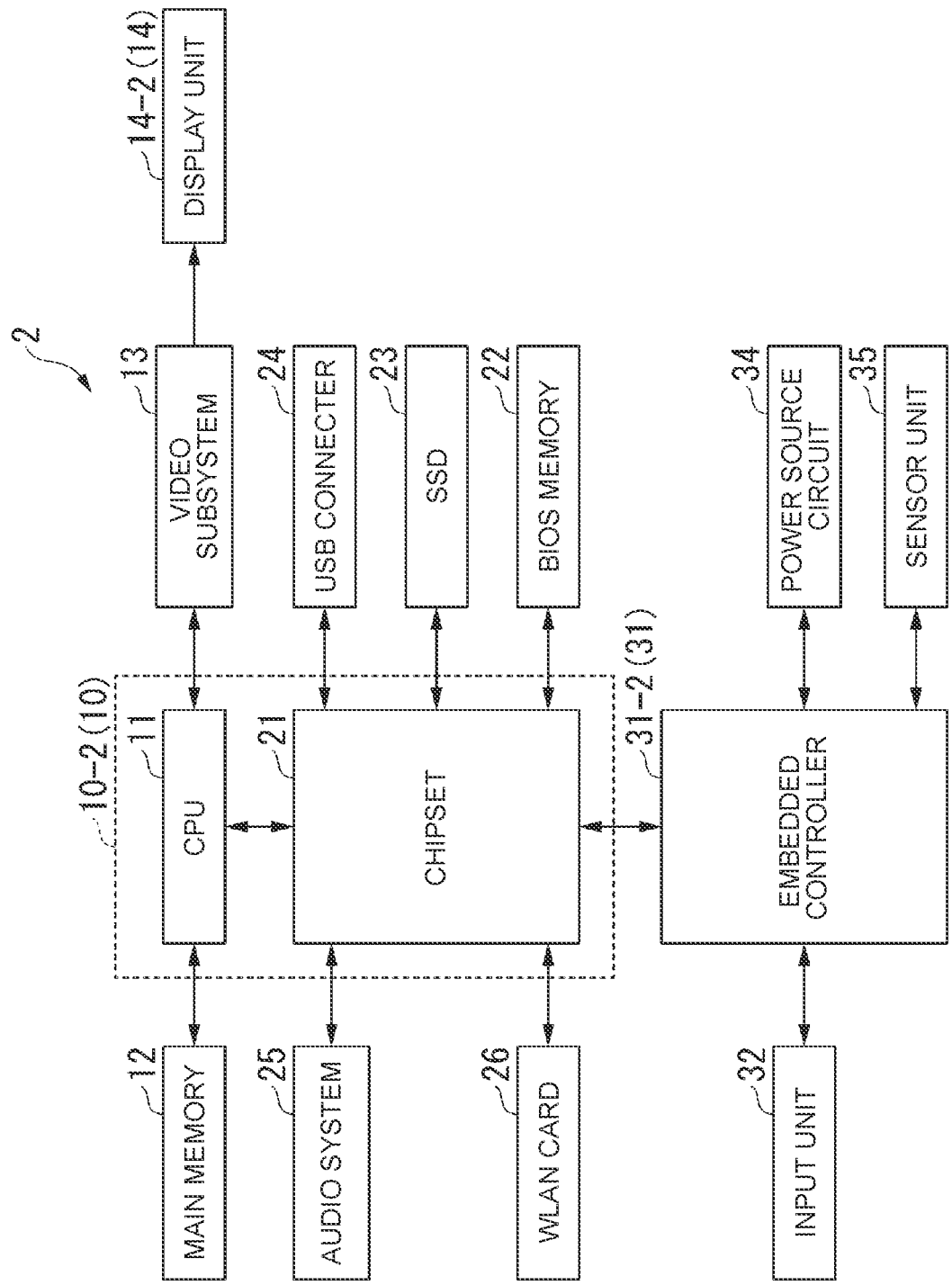
FIG. 3 is a diagram illustrating one example of main hardware constitutional elements of a laptop PC according to the first embodiment.

Next, main hardware constitutional elements of the laptop PC 2 will be described with reference to FIG. 3. As illustrated in FIG. 3, the laptop PC 2 includes the CPU 11, the main memory 12, the video subsystem 13, the display unit 14-2, the chipset 21, the BIOS memory 22, the SSD 23, the USB connector 24, the audio system 25, the WLAN card 26, the embedded controller 31, the input unit 32, the power source circuit 34 and the sensor unit 35.

Incidentally, in FIG. 3, description of the respective constitutional elements of the laptop PC 2 which are the same as the constitutional elements of the tablet terminal 1 which are illustrated in FIG. 2 will be omitted here simply by assigning the symbols which are the same as those in FIG. 2 to the respective constitutional elements of the laptop PC 2. In addition, with regards to each constitutional element, in a case where each constitutional element is to be distinguished between the tablet terminal 1 and the laptop PC 2, respective constitutional elements are distinguished from each other by assigning "-1" to the symbol of each constitutional element of the tablet terminal 1 and assigning "-2" to the symbol of each constitutional element of the laptop PC 2.

The configuration of the laptop PC 2 is different from the configuration of the tablet terminal 1 in the point that the laptop PC 2 includes the display unit 14-2 in place of the touch screen 20 which includes the display unit 14-1 and the touch sensor unit 33.

Next, functional constitutional elements of the information processing system 100 according to the first embodiment of the present invention will be described with reference to FIG. 4.

Figure 4:
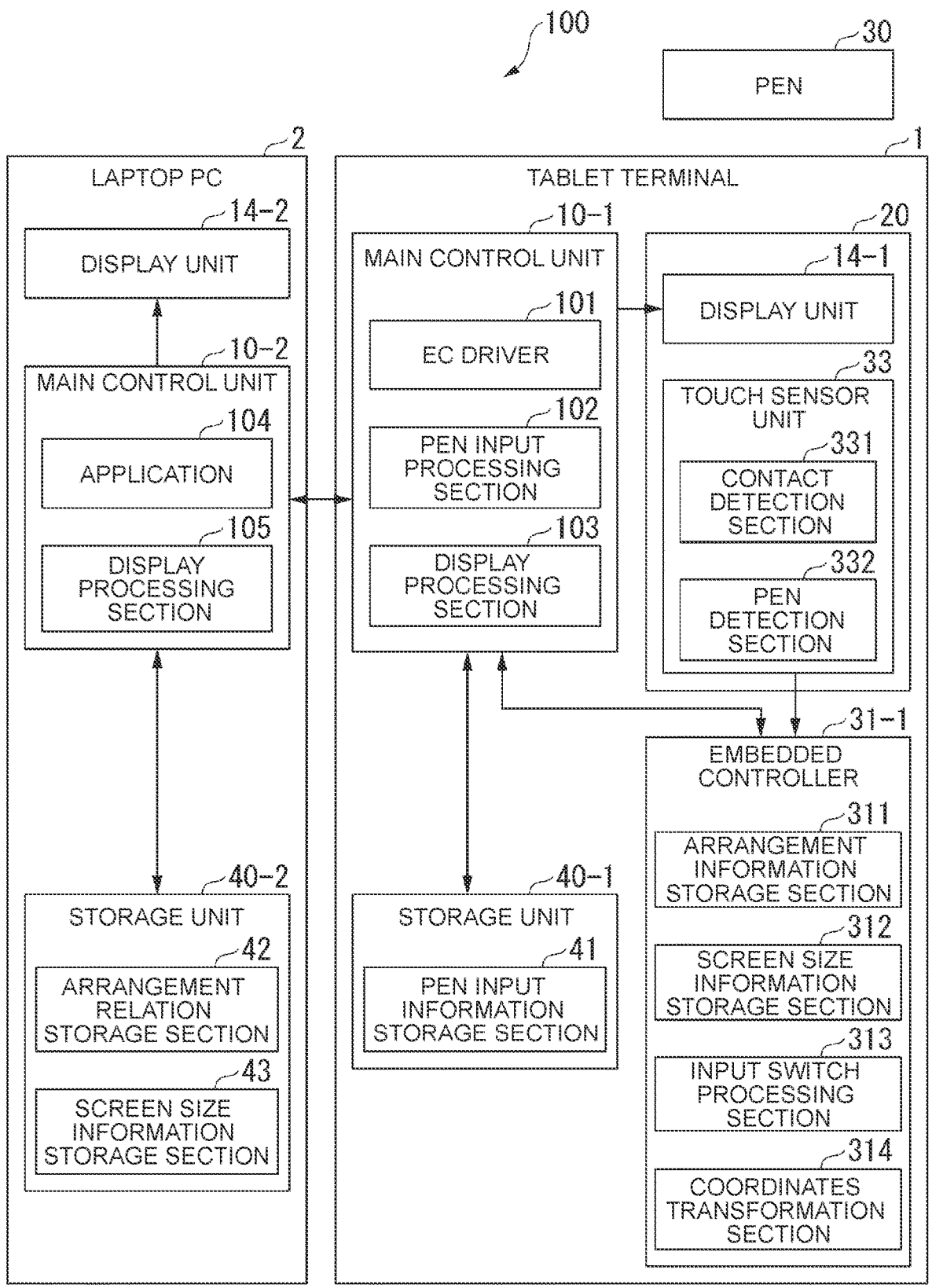
FIG. 4 is a block diagram illustrating one example of functional constitutional elements of the information processing system according to the first embodiment.

FIG. 4 is a block diagram illustrating one example of the functional constitutional elements of the information processing system 100 according to the first embodiment of the present invention.

As illustrated in FIG. 4, the information processing system 100 includes the tablet terminal 1, the laptop PC 2 and the pen 30. In addition, the tablet terminal 1 includes the main control unit 10-1, the touch screen 20, an embedded controller 31-1 and a storage unit 40-1. In addition, the laptop PC 2 includes a main control unit 10-2, the display unit 14-2 and a storage unit 40-2.

The main control unit 10-1 of the tablet terminal 1 and the main control unit 10-2 of the laptop PC 2 are connected to each other via, for example, HDMI (the registered trademark, High-Definition Multimedia Interface), a USB-C interface, a Display Port interface, a WiDi (Wireless Display) interface, a USB interface, a Bluetooth (the registered trademark) interface and so forth.

Incidentally, in FIG. 4, only the main functional constitutional elements which relate to the first embodiment of the present invention are illustrated as constitutional elements of the information processing system 100.

The storage unit 40-2 is realized by, for example, the main memory 12 or the SSD 23 of the laptop PC 2 and stores various information such as, for example, information which indicates an arrangement relation between the display unit 14-1 and the display unit 14-2, a screen size of the display unit 14-2 and so forth. The storage unit 40-2 includes an arrangement relation storage section 42 and a screen size information storage section 43.

The arrangement relation storage section 42 is realized by, for example, the main memory 12 or the SSD 23 of the laptop PC 2 and stores setting information which indicates an arrangement relation between the screen (a monitor) of the display unit 14-1 and the screen (a monitor) of the display unit 14-2. The arrangement relation storage unit 42 stores, for example, monitor arrangement setting information in the OS.

In addition, for example, in the example which is illustrated in FIG. 1, the screen of the display unit 14-1 of the tablet terminal 1 is extended on the screen of the display unit 14-2 of the laptop PC 2 and constitutes one screen, the screen of the display unit 14-2 of the laptop PC 2 is arranged on the left side and the screen of the display unit 14-1 of the tablet terminal 1 is arranged on the right side. In this case, the arrangement relation storage unit 42 stores the arrangement relation which indicates that the screen of the display unit 14-2 of the laptop PC 2 is arranged on the left side and the screen of the display unit 14-1 of the tablet terminal 1 is arranged on the right side.

The screen size information storage section 43 is realized by, for example, the main memory 12 or the SSD 23 of the laptop PC 2 and stores information on the screen size of the display unit 14-2. The screen size information storage section 43 stores, for example, the number of pixels which are vertically and horizontally arranged on the screen of the display unit 14-2, vertical and horizontal lengths of the screen thereof and so forth.

The main control unit 10-2 is a functional unit which is realized by executing the program that the main memory 12 of the laptop PC 2 stores by the CPU 11 and the chipset 21 of the laptop PC 2 and executes OS-based various processing. For example, in a case where setting information (arrangement relation information) on monitor arrangement that the arrangement relation storage section 42 stores is changed by a user, the main control unit 10-2 transmits the arrangement relation information which is so changed by the user to the main control unit 10-1 of the tablet terminal 1.

In addition, the main control unit 10-2 includes, for example, an application 104 and a display processing section 105.

The application 104 is a functional section which is realized by executing the program that the main memory 12 of the laptop PC 2 stores by the CPU 11 and the chipset 21 of the laptop PC 2 and executes various OS-based processing. The application 104 executes processing which includes drawing software-based processing and pen-based processing of inputting a handwritten memo and so forth.

The display processing section 105 is a functional section which is realized by executing the program that the main memory 12 of the laptop PC 2 stores by the CPU 11 and the chipset 21 of the laptop PC 2 and is, for example, a display driver. The display processing section 105 makes the display unit 14-2 display an image, for example, in response to a request from the application 104 and outputs an image which is to be displayed on the display unit 14-1 to the main control unit 10-1 of the tablet terminal 1. Incidentally, in the first embodiment, images which are different from each other are displayed on the display unit 14-1 and the display unit 14-2 respectively as illustrated in FIG. 1.

The display unit 14-2 is a main display unit of the laptop PC 2 and displays the image which is output from the application 104 via the display processing section 105.

The storage unit 40-1 is realized by, for example, the main memory 12 or the SSD 23 of the tablet terminal 1 and stores various kinds of information such as, for example, pen input information and so forth. The storage unit 40-1 includes a pen input information storage section 41.

The pen input information storage section 41 is realized by the main memory 12 or the SSD 23 of the tablet terminal 1 and stores the pen input information (for example, handwritten input information on the movement locus and so forth of the pen 30 and others) which is detected by using the touch screen 20. The pen input information that the pen input information storage section 41 stores is transmitted to the laptop PC 2 as input information on the extended pen tablet.

The main control unit 10-1 is a functional unit which is realized by executing the program that the main memory 12 of the tablet terminal stores by the CPU 11 and the chipset 21 of the tablet terminal 1 and executes various OS-based processing. The main control unit 10-1 executes control for making the tablet terminal 1 function as the extended pen tablet. In addition, the main control unit 10-1 includes, for example, an EC driver 101, a pen input processing section 102 and a display processing section 103.

The EC driver 101 is a functional section which is realized by executing the program that the main memory 12 of the tablet terminal 1 stores by the CPU 11 and the chipset 21 of the tablet terminal 1 and is a device driver which controls the operation of the embedded controller 31. The EC driver 101 controls the operation of the embedded controller 31, acquires the touch input and the pen input that the touch sensor unit 33 detects and supplies the acquired touch input and pen input to the pen input processing section 102 which will be described later.

The pen input processing section 102 is a functional section which is realized by executing the program that the main memory 12 of the tablet terminal 1 stores by the CPU 11 and the chipset 21 of the tablet terminal 1 and controls pen input processing such as handwriting input and others which are executed by using the touch screen 20 and the pen 30. The pen input processing section 102 acquires the contact position of the pen 30 on the screen DF of the display unit 14-1 that the touch sensor unit 33 of the touch screen 20 detects and executes pen-input processing by switching between an input mode (a first pen input mode) of the tablet screen (the screen DF of the display unit laptop 4-1) and an input mode (a second pen input mode) of the laptop PC screen (the screen of the display unit 14-2).

Here, the tablet screen input mode (the first pen input mode) is adapted to make the display unit 14-1 display the movement locus of the pen 30 on the screen DF of the display unit 14-1 which is based on the contact position of the pen 30. In addition, the laptop PC screen input mode (the second pen input mode) is adapted to make the display unit 14-2 (the second display unit) display the movement locus of the pen 30.

The pen input processing section 102 switches between the tablet screen input mode and the laptop PC screen input mode in accordance with, for example, a request for switching between the input modes which is issued from the embedded controller 31-1.

In addition, the pen input processing section 102 makes the display unit 14-1 display the movement locus of the pen 30 on the screen DF of the display unit 14-1 via the display processing section 103 in the tablet screen input mode.

In addition, the pen input processing section 102 makes the display unit 14-2 display the movement locus of the pen 30 which is based on the coordinates of the pen 30 on the screen of the display unit 14-2 that a coordinates transformation section 314 of the embedded controller 31-1 transforms in the laptop PC screen input mode. In this case, the pen input processing section 102 transmits the movement locus of the pen 30 to the main control unit 10-2 of the laptop PC 2 and makes the display unit 14-2 display the movement locus of the pen 30 via the display processing section 105.

In addition, the pen input processing section 102 stores the movement locus of the pen 30 into the pen input information storage unit 41 as pen input information. The pen input processing section 102 transmits the pen input information that the pen input information storage unit 41 stores to the main control unit 10-2 of the laptop PC 2.

The display processing section 103 is a functional section which is realized by executing the program that the main memory 12 of the tablet terminal 1 stores by the CPU 11 and the chipset 21 of the tablet terminal 1 and is, for example, a display driver. The display processing section 103 makes the display unit 14-1 display, for example, image data which is so received from the main control unit 10-2 of the laptop PC 2 as to be displayed on the display unit 14-1. In addition, the display processing section 103 makes the display unit 14-1 display the movement locus of the pen 30 on the screen DF of the display unit 14-1 in response to a request from the pen input processing section 102.

The embedded controller 31-1 acquires the pen input information (for example, information on the coordinates of the pen 30 on the screen DF) that the touch sensor unit 33 detects and transmits the pen input information to the main control unit 10-1. Here, the embedded controller 31-1 is one example of an independent built-in control unit which is different from the main control unit 10-1. In addition, in a case where an operation of hovering swipe-out which will be described later and which is performed by using the pen 30 is detected, the embedded controller 31-1 transmits a switch request for switching to an input mode which is appropriate for the operation of hovering swipe-out to the main control unit 10-1.

In addition, the embedded controller 31-1 receives an arrangement relation between the screen DF of the first display unit 14-1 and the screen of the second display unit 14-2 and screen size information from the main control unit 10-2 of the laptop PC 2, makes an arrangement information storage section 311 store arrangement information which indicates the arrangement relation and makes a screen size information storage section 312 store the screen size information.

The embedded controller 31-1 includes the arrangement information storage section 311, the screen size information storage section 312, an input switch processing section 313 and the coordinates transformation section 314.

The arrangement information storage section 311 is realized by a RAM (Read Only Memory) and so forth that the embedded controller 31-1 builds therein. The arrangement information control section 311 stores the arrangement information which indicates the arrangement relation between the screen DF of the display unit 14-1 and the screen of the display unit 14-2. The arrangement information storage section 311 stores the arrangement information that the operations of hovering swipe-out which will be described later and the input modes to be switched are listed in one-to-one correspondence, for example, as illustrated in FIG. 5.

FIG. 5 is a diagram illustrating one example of data which is stored in the arrangement information storage section 311 in the first embodiment.

As illustrated in FIG. 5, the arrangement information storage section 311 stores screen edges and input switching operations in one-to-one correspondence. In FIG. 5, "SCREEN EDGE" indicates an end (an edge) of the screen which is oriented in a moving direction of the pen 30 in the operation of hovering swipe-out. That is, "SCREEN EDGE" indicates the end of the screen which is oriented in the moving direction of the pen 30 for an input switching operation which is based on the arrangement relation between the screens of the display units 14-1 and 14-2. In addition, "INPUT SWITCH" indicates each input mode for performing the input switching operation.

Incidentally, the example which is illustrated in FIG. 5 is one example of a case where the screen DF of the display unit 14-1 is located on the right side and the screen of the display unit 14-2 is located on the left side in the screen arrangement relation as illustrated in FIG. 1.

As illustrated in FIG. 5, a case where the screen edge is "RIGHT-SIDE EDGE" indicates to switch to "PEN INPUT ON TABLET SCREEN" (a tablet screen input mode).

In addition, a case where the screen edge is "LEFT-SIDE EDGE" indicates to switch to "PEN INPUT ON LAPTOP PC SCREEN" (a laptop PC screen input mode).

In addition, a case where the screen edge is "UPPER-SIDE EDGE" or "LOWER-SIDE EDGE" indicates "NO INPUT SWITCH".

The arrangement information storage section 311 stores an input switch table that the screen edges and the input switching operations are listed in one-to-one correspondences as the arrangement information which indicates the arrangement relation between the display unit 14-1 and the display unit 14-2 in this way.

Returning to the description of the example in FIG. 4, the screen size information storage section 312 is realized by a RAM (Read Only Memory) and so forth that the embedded controller 31-1 builds therein. The screen size information storage section 312 stores the screen size information which is received from the main control unit 10-2 of the laptop PC 2.

The input switch processing section 313 is a functional section which is realized by executing the program that the ROM stores by the CPU that the embedded controller 31-1 builds therein. After detection of approach of the pen 30 by the touch sensor unit 33, the input switch processing section 313 switches between the tablet screen input mode and the laptop PC input mode alternately in accordance with a moving operation of the pen 30 in the non-contact state of the pen 30 which is based on a specific arrangement relation. In a case where the operation of hovering swipe-out which is performed by the pen 30 is detected, the input switch processing section 313 switches to one input mode which corresponds to the screen of a switching destination between the tablet screen input mode and the laptop PC screen input mode.

Here, the operation of hovering swipe-out which is performed by the pen 30 is an operation of moving the pen 30 above the screen DF of the display unit 14-1 in a direction of indicating the screen of the switching destination on the basis of the arrangement information after detection of a hovering state that the pen 30 maintains a state of approaching the point which is located within the threshold distance in a state of locating above the screen DF of the display unit 14-1 with no contact with the screen DF for a fixed time period by the touch sensor unit 33. In addition, the arrangement information is stored in the arrangement information storage section 311.

Here, one example of the operation of hovering swipe-out which is performed by the pen 30 will be described with reference to FIG. 6 and FIG. 7.

FIG. 6 and FIG. 7 are diagrams illustrating examples of the operation of hovering swipe-out in the first embodiment. In FIG. 6 and FIG. 7, a distance L indicates a distance between the screen DF of the display unit 14-1 and the pen 30 and a threshold distance Lth is set to a threshold value which makes it possible for the pen detection section 332 of the touch senor unit 33 to detect the pen 30 in the non-contact state. In addition, an edge LE of the screen DF indicates the left-side end (edge) of the screen DF and an edge RE of the screen DF indicates the right-side end (edge) of the screen DF.

In addition, as illustrated in FIG. 6, in a case where the pen 30 is operated to come closer to a point of the distance L which is within the threshold distance Lth and is moved beyond the edge LE of the screen DF, the embedded controller 31-1 detects the above operation as the operation of hovering swipe-out of the left-side edge.

In addition, as illustrated in FIG. 7, in a case where the pen 30 is operated to come closer to the point of the distance L which is within the threshold distance Lth and is moved beyond the edge RE of the screen DF, the embedded controller 31-1 detects the above operation as the operation of hovering swipe-out of the right-side edge.

In a case where the operation of hovering swipe-out of the right-side edge such as that which is illustrated, for example, in FIG. 7 is detected, the input switch processing section 313 which is illustrated in FIG. 4 transmits a switch request for switching to the tablet screen input mode to the main control unit 10-1 on the basis of the arrangement information that the arrangement information storage section 311 stores as illustrated in FIG. 5.

In addition, for example, in a case where the operation of hovering swipe-out of the left-side edge such as that which is illustrated in FIG. 6 is detected, the input switch processing section 313 transmits a switch request for switching to the laptop PC screen input mode to the main control unit 10-1 on the basis of the arrangement information that the arrangement information storage section 311 stores as illustrated in FIG. 5.

In addition, for example, in a case where the operation of hovering swipe-out of the upper-side edge or the lower-side edge is detected, the input switch processing section 313 does not execute switching of the input mode on the basis of the arrangement information that the arrangement information storage section 311 stores as illustrated in FIG. 5.

The coordinates transformation section 314 is a functional section which is realized by executing the program that the ROM stores by the CPU that the embedded controller 31-1 builds therein. The coordinates transformation section 314 transforms the coordinates of the pen 30 on the screen DF of the display unit 14-1 to the coordinates of the pen 30 on the screen of the display unit 14-2 on the basis of the screen size information that the screen size information storage section 312 stores. In a case where the laptop PC screen input mode is set, the coordinates transformation section 314 transforms the coordinates of the pen 30 on the screen DF of the display unit 14-1 to the coordinates of the pen 30 on the screen of the display unit 14-2 and transmits the coordinates of the pen 30 on the screen of the display unit 14-2 which are transformed to the pen input processing section 102 of the main control unit 10-1.

Next, the operation of the information processing system 100 according to the first embodiment of the present invention will be described with reference to the drawings.

Figure 8:
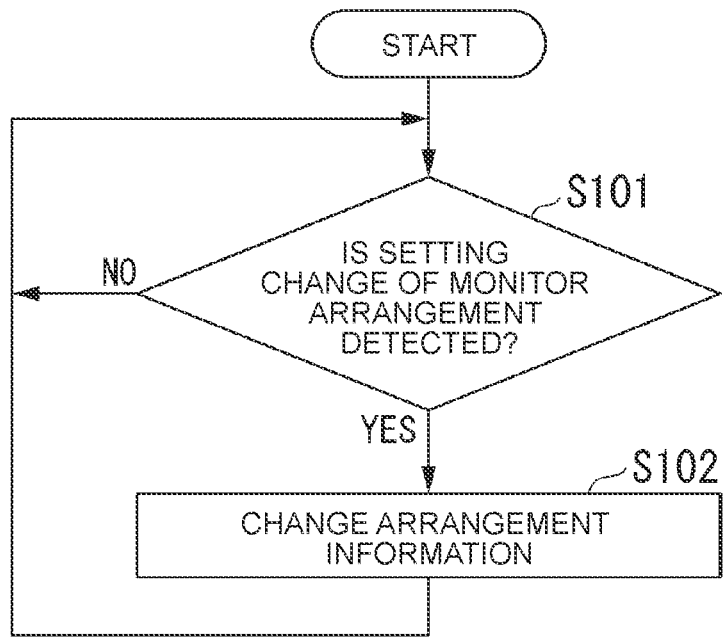
FIG. 8 is a flowchart illustrating one example of setting change processing of monitor arrangement in the information processing system according to the first embodiment of the present invention.

FIG. 8 is a flowchart illustrating one example of monitor arrangement setting change processing in the information processing system 100 according to the first embodiment of the present invention.

Here, one example of processing which is executed in a case where the monitor arrangement setting information that the arrangement relation storage unit 42 stores is changed by the user will be described.

As illustrated in FIG. 8, the main control unit 10-2 of the laptop PC 2 decides whether setting change of the monitor arrangement is detected (step S101). The main control unit 10-2 decides whether the setting change of the monitor arrangement is detected depending on whether the monitor arrangement setting information that the arrangement relation storage unit 42 stores is changed. In a case where the monitor arrangement setting change is detected (step S101: YES), the main control unit 10-2 proceeds the process to step S102. On the other hand, in a case where the monitor arrangement setting change is not detected (step S101: NO), the main control unit 10-2 returns the process to step S101.

In step S102, the main control unit 10-2 changes the arrangement information. The main control unit 10-2 transmits the monitor arrangement setting information (the arrangement relation information) that the arrangement relation storage unit 42 stores to the main control unit 10-1 of the tablet terminal 1 and urges to change the arrangement information that the arrangement information storage section 311 stores. The main control unit 10-1 transmits the monitor arrangement setting information (the arrangement relation information) which is received to the embedded controller 31-1 and urges to change the arrangement information of the type which is illustrated in, for example, FIG. 5 and that the arrangement information storage section 311 stores. After execution of the process in step S102, the main control unit 10-2 returns the process to step S101.

Next, the pen input switch processing in the information processing system 100 according to the first embodiment of the present invention will be described with reference to FIG. 9.

Figure 9:
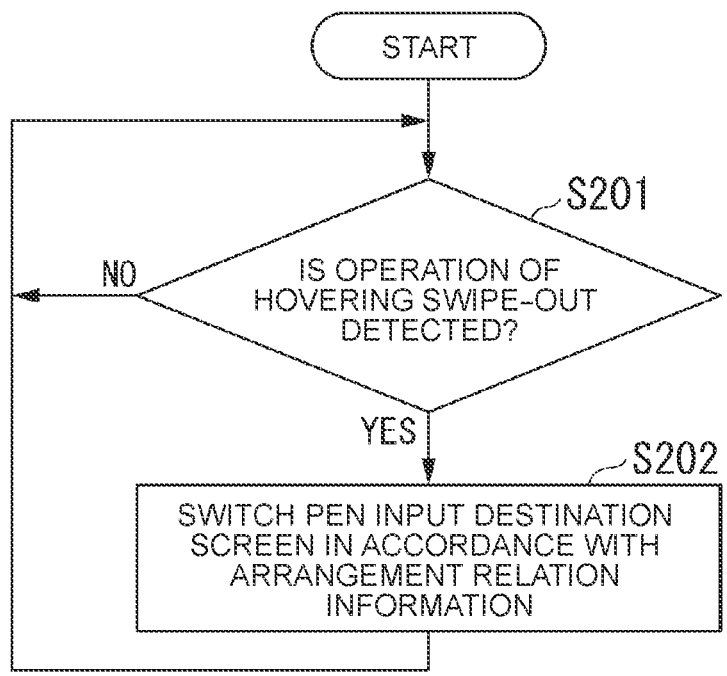
FIG. 9 is a flowchart illustrating one example of pen input switch processing in the information processing system according to the first embodiment of the present invention.

FIG. 9 is a flowchart illustrating one example of the pen input switch processing in the information processing system 100 according to the first embodiment of the present invention.

As illustrated in FIG. 9, first, the input switch processing section 313 of the tablet terminal 1 decides whether the operation of hovering swipe-out is detected (step S201). The input switch processing section 313 decides whether the operation of hovering swipe-out is detected on the basis of detection of the pen 30 by the pen detection section 332 of the touch sensor unit 33. In a case where the operation of hovering swipe-out is detected (step S201: YES), the input switch processing section 313 proceeds the process to step S202. On the other hand, in a case where the operation of hovering swipe-out is not detected (step S201: NO), the input switch processing section 313 returns the process to step S201.

In step S202, the input switch processing section 313 switches the screen of the pen input destination in accordance with the arrangement relation information. That I, the input switch processing section 313 switches the input mode on the basis of the edge of the screen of the operation of hovering swipe-out and the arrangement information of the type that the arrangement information processing section 311 stores and which is illustrated in, for example, FIG. 5. The input switch processing section 313 transmits a switch request for switching to the input mode which corresponds to the screen edge which is acquired from the arrangement information storage section 311 to the main control unit 10-1. After execution of the process in step S202, the input switch processing section 313 returns the process to step S201.

Next, a concrete example of the operation of the information processing system 100 according to the first embodiment of the present invention will be described with reference to FIG. 10.

Figure 10:
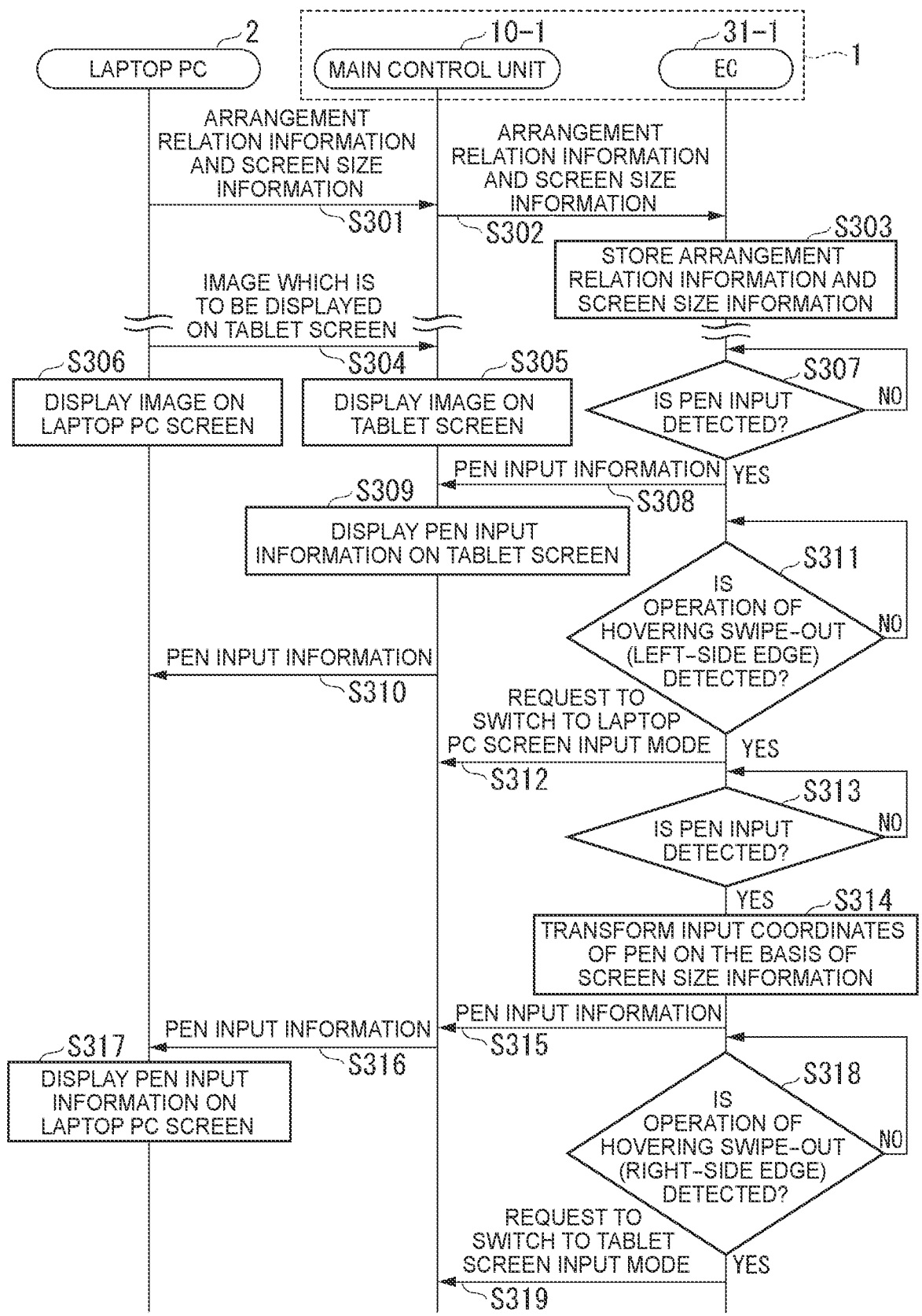
FIG. 10 is a flowchart illustrating one example of an operation of the information processing system according to the first embodiment of the present invention.

FIG. 10 is a flowchart illustrating one example of the operation of the information processing system 100 according to the first embodiment of the present invention. Here, one example of processing of setting the arrangement relation information and the screen size information and one example of processing of switching from the tablet screen input mode to the laptop PC screen input mode and then switching again to the tablet screen input mode will be described.

In FIG. 10, first, the laptop PC 2 transmits the arrangement relation information which is the monitor screen setting information and the information on the size of the screen of the display unit 14-2 to the main control unit 10-1 of the tablet terminal 1 (step S301). The main control unit 10-2 of the laptop PC 2 transmits the arrangement relation information and the screen size information to the main control unit 10-1.

Next, the main control unit 10-1 transmits the arrangement relation information and the screen size information to the embedded controller 31-1 (step S302). The main control unit 10-1 transmits the arrangement relation information and the screen size information to the embedded controller 31-1 via the EC driver 101.

Next, the embedded controller 31-1 stores the arrangement relation information and the screen size information (step S303). The embedded controller 31-1 makes the arrangement information storage section 311 store the arrangement information of the type which is based on the received arrangement relation information and is illustrated in, for example, FIG. 5. In addition, the embedded controller 31-1 makes the screen size information storage section 312 store the received screen size information.

Next, the laptop PC 2 transmits the image which is to be displayed on the tablet screen to the main control unit 10-1 (step S304). For example, the application 104 of the laptop PC 2 functions to transmit the image which is to be displayed on the tablet screen to the main control unit 10-1.

Next, the main control unit 10-1 displays the image on the tablet screen (step S305). The display processing section 103 of the main control unit 10-1 makes the display unit 14-1 display the image which is so received as to be displayed on the tablet screen.

In addition, the laptop PC 2 displays the image on the laptop PC screen (step S306). The application 104 of the laptop PC 2 functions to make the display unit 14-2 display the image which is displayed on the screen of the laptop PC 2 via the display processing section 105. Incidentally, it is assumed that the image which is displayed on the tablet screen is different from the image which is displayed on the laptop PC screen.

Next, the embedded controller 31-1 decides whether the pen input is detected (step S307). The embedded controller 31-1 decides whether the pen input is detected by the contact detection section 331 and the pen detection section 332 of the touch sensor unit 33. In a case where the pen input is detected (step S307: YES), the embedded controller 31-1 proceeds the process to step S308. On the other hand, in a case where the pen input is not detected (step S307: NO), the embedded controller 31-1 returns the process to the step 307.

In step S308, the embedded controller 31-1 transmits the pen input information to the main control unit 10-1. The embedded controller 31-1 transmits, for example, the movement locus (a pen stroke) of the pen 30 to the main control unit 10-1 as the pen input information.

Next, the main control unit 10-1 displays the pen input information on the tablet screen (step S309). The pen input processing section 102 of the main control unit 10-1 makes the display unit 14-1 display the pen input information (the movement locus of the pen 30) which is received from the embedded controller 31-1 via the EC driver 101 as the processing which is executed in the tablet screen input mode via the display processing section 103.

Next, the pen input processing section 102 transmits the pen input information to the laptop PC 2 (step S310). The pen input information which is transmitted to the laptop PC 2 is utilized for, for example, processing of the application 104.

In addition, the embedded controller 31-1 decides whether the operation of hovering swipe-out (the left side edge) is detected (step S311). The embedded controller 31-1 decides whether the operation of hovering swipe-out (the left-side edge) is detected by the pen detection section 332 of the touch sensor unit 33. In a case where the operation of hovering swipe-out (the left-side edge) is detected (step S311: YES), the embedded controller 31-1 proceeds the process to step S312. On the other hand, in a case where the operation of hovering swipe-out (the left-side edge) is not detected (step S311: NO), the embedded controller 31-1 returns the process to step S311.

In step S312, the embedded controller 31-1 transmits a switch request for switching to the laptop PC screen input mode to the main control unit 10-1. That is, the input switch processing section 313 of the embedded controller 31-1 transmits the switch request for switching to the laptop PC screen input mode on the basis of the arrangement information of the type that the arrangement information storage section 311 stores and which is illustrated, for example, in FIG. 5. Thereby, the pen input processing section 102 of the main control unit 10-1 is switched from the tablet screen input mode to the laptop PC screen input mode.

The embedded controller 31-1 decides whether the pen input is detected (step S313). The embedded controller 31-1 decides whether the pen input is detected by the contact detection section 331 and the pen detection section 332 of the touch sensor unit 33. In a case where the pen input is detected (step S313: YES), the embedded controller 31-1 proceeds the process to step S314. On the other hand, in a case where the pen input is not detected (step S313: NO), the embedded controller 31-1 returns the process to step S313.

In step S314, the embedded controller 31-1 transforms the pen input coordinates on the basis of the screen size information. That is, the coordinates transformation section 314 of the embedded controller 31-1 transforms the pen input coordinates which are detected by the contact detection section 331 and the pen detection section 332 of the touch sensor unit 33 to the pen input coordinates which correspond to the screen size of the display unit 14-2 on the basis of the screen size information that the screen size information storage section 312 stores.

Next, the embedded controller 31-1 transmits pen input information which is based on the transformed pen input coordinates to the main control unit 10-1 (step S315). The embedded controller 31-1 transmits the movement locus (the pen stroke) of the pen 30 which is based on the transformed pen input coordinates to the main control unit 10-1 as the pen input information.

Next, the main control unit 10-1 transmits the pen input information to the laptop PC 2 (step S316). That is, the pen input processing section 102 of the main control unit 10-1 transmits the pen input information (the movement locus of the pen 30) which is received from the embedded controller 31-1 via the EC driver 101 to the laptop PC 2.

Next, the laptop PC displays the pen input information on the laptop PC screen (step S317). The main control unit 10-2 of the laptop PC 2 makes the display unit 14-2 display the received pen input information (the movement locus of the pen 30) via the display processing section 105.

In addition, the embedded controller 31-1 decides whether the operation of the hovering swipe-out (the right-side edge) is detected (step S318). The embedded controller 31-1 decides whether the operation of the hovering swipe-out (the left-side edge) is detected by the pen detection section 332 of the touch sensor unit 33. In a case where the operation of hovering swipe-out (the right-side edge) is detected (step S318: YES), the embedded controller 31-1 proceeds the process to step S319. On the other hand, in a case where the operation of hovering swipe-out (the right-side edge) is not detected (step S318: NO), the embedded controller 31-1 returns the process to step S318.

In step S319, the embedded controller 31-1 transmits a switch request for switching to the tablet screen input mode to the main control unit 10-1. That is, the input switch processing section 313 of the embedded controller 31-1 transmits the switch request for switching to the tablet screen input mode to the main control unit 10-1 on the basis of the arrangement information of the type that the arrangement information storage section 311 stores and which is illustrated, for example, in FIG. 5. Thereby, the pen input processing section 102 of the main control unit 10-1 is switched from the laptop PC screen input mode to the tablet screen input mode.

As described above, the tablet terminal 1 (the information processing device) according to the first embodiment of the present invention includes the display unit 14-1 (the first display unit), the touch sensor unit 33, the pen input processing section 102 and the input switch processing section 313. The touch sensor unit 33 is arranged on the screen of the display unit 14-1 and therefore it becomes possible for the touch sensor unit 33 to detect the contact position of the object on the screen and to detect the approach of the pen 30 which approaches the point which is located within the threshold distance above the screen of the display unit 14-1 and the position of the pen 30 above the screen. The pen input processing section 102 executes the pen-input processing by switching between the tablet screen input mode (the first pen input mode) and the laptop PC screen input mode (the second pen input mode). Here, the tablet screen input mode (the first pen input mode) is adapted to acquire the contact position of the pen 30 on the screen DF of the display unit 14-1 that the touch sensor section 33 detects and to make the display unit 14-1 display the movement locus of the pen 30 on the screen DF of the display unit 14-1 which is based on the contact position of the pen 30. In addition, the laptop PC screen input mode (the second pen input mode) is adapted to make the display unit 14-2 (the second display unit) which is set to the specific arrangement relation with the display unit 14-1 display the movement locus of the pen 30. After detection of the approach of the pen 30 by the touch sensor unit 33, the input switch processing section 313 switches between the tablet screen input mode and the laptop PC screen input mode alternately in accordance with an operation of moving the pen 30 which is performed in the non-contact state which is based on the specific arrangement relation.

Thereby, in a case where the pen input is performed on one display unit (for example, the display unit 14-1) of the information processing system 100 which has two display units 14 (two display screens 14-1 and 14-2) by switching between the first and second input modes, it becomes possible for the tablet terminal 1 (the information processing device) according to the first embodiment of the present invention to readily perform switching of the target screen for the pen input by operating the pen 30. That is, for example, in a case where the tablet terminal 1 is operated as an extended pen tablet, it becomes unnecessary for the tablet terminal 1 (the information processing device) according to the first embodiment of the present invention to switch the target screen for the pen input between the laptop PC screen and the tablet screen by opening a setting change menu and it becomes possible to readily perform switching of the target screen for the pen input by operating the pen 30. Accordingly, it becomes possible for the tablet terminal 1 according to the first embodiment of the present invention to readily perform switching of the target screen for the pen input and to improve the user experience.

In addition, the tablet terminal 1 according to the first embodiment of the present invention includes the arrangement information storage section 311 which stores the arrangement information which indicates the arrangement relation between the display unit 14-1 and the display unit 14-2. In a case where the operation of hovering swipe-out is detected, the input switch processing section 313 switches to one input mode which corresponds to the screen of a switch destination between the tablet screen input mode and the laptop PC screen input mode. Here, the operation of hovering swipe-out is an operation of moving the pen 30 above the screen of the display unit 14-1 in a direction which indicates the screen of the switch destination on the basis of the arrangement information after detection of a hovering state that the pen 30 maintains a state of out-of-contact with the screen of the display unit 4-1 and a state of approaching the point which is located within the threshold distance for a fixed time period by the touch sensor unit 33.

Thereby, it becomes possible for the tablet terminal 1 according to the first embodiment of the present invention to readily perform switching of the pen input target screen by a simple operation which is called the operation of hovering swipe-out and is performed with no contact with the screen DF.

In addition, the tablet terminal 1 according to the first embodiment of the present invention includes the screen size information storage section 312 and the coordinates transformation section 314. The screen size information storage section 312 stores the screen size information which indicates the size of the screen of the display unit 14-2. The coordinates transformation section 314 transforms the coordinates of the pen 30 on the screen DF of the display unit 14-1 to the coordinates of the pen 30 on the screen of the display unit 14-2 on the basis of the screen size information that the screen size information storage section 312 stores. The pen input processing section 102 makes the display unit 14-2 display the movement locus of the pen 30 which is based on the coordinates of the pen 30 on the screen of the display unit 14-2 that the coordinate transformation section 314 transforms in the second pen input mode.

Thereby, it becomes possible for the tablet terminal 1 according to the first embodiment of the present invention to appropriately display the pen input information (for example, the movement locus of the pen 30) which is input on the screen DF of the display unit 14-1 by using the coordinates transformation section 314.

In addition, the tablet terminal 1 according to the first embodiment of the present invention includes the main control unit 10-1 and the embedded controller 31-1 (a built-in control unit). The main control unit 10-1 executes processing which is based on the OS (for example, Windows (the registered trademark)). The embedded controller 31-1 is an independent control unit which is different from the main control unit 10-1. The main control unit 10-1 includes the pen input processing section 102 and the embedded controller 31-1 includes the input switch processing section 313 and the coordinates transformation section 314.

Thereby, since the independent embedded controller 31-1 which is different from the main control unit 10-1 executes the input-switch processing and the coordinates transformation processing, it becomes possible for the tablet terminal 1 according to the first embodiment to rapidly execute the input-switch processing and the coordinates transformation processing while reducing a processing load which is exerted on the main control unit 10-1

In addition, the information processing system 100 according to the first embodiment of the present invention includes the display unit 14-1 (the first display nit), the display unit 14-2 (the second display unit), the touch sensor unit 33, the pen input processing section 102 and the input switch processing section 313. The touch sensor unit 33 is arranged on the screen DF of the display unit 14-1 and therefore it is possible for the touch sensor unit 33 to detect the contact position of the object on the screen DF of the display unit 14-1 and approach of the pen 30 which approaches the point which is located within the threshold distance above the screen DF of the display unit 14-1 and the position of the pen 30 above the screen DF of the display unit 14-1 in a state that the pen 30 is out of contact with the screen DF. The display unit 14-2 is so set as to have the specific arrangement relation with the display unit 14-1. The pen input processing section 102 executes the pen-input processing by switching between the tablet screen input mode (the first pen input mode) and the laptop PC screen input mode (the second pen input mode). After detection of the approach of the pen 30 by the touch sensor unit 33, the input switch processing section 313 switches between the tablet screen input mode and the laptop PC screen input mode alternately in accordance with the moving operation of the pen 30 which is performed in the non-contact state which is based on the specific arrangement relation between the display units 14-1 and 14-2.

Thereby, the information processing system 100 according to the first embodiment of the present invention exhibits the effects which are the same as the effects of the tablet terminal 1 and thereby it becomes possible for the information processing system 100 to readily perform switching of the pen input target screen and to improve the user experience.

In addition, a controlling method according to the first embodiment of the present invention is a method of controlling the operation of the information processing system 100 which includes the display unit 14-1, the touch sensor unit 33 which is so arranged on the screen DF of the display unit 14-1 as to make it possible to detect the contact position of the object on the screen DF and to detect approach of the pen 30 which approaches the point which is located within the threshold distance above the screen DF in the state that the pen 30 is out-of-contact with the screen DF and the position of the pen 30 above the screen DF of the display unit 14-1 and the display unit 14-2 which is so set as to have the specific arrangement relation with the display unit 14-1 and includes the pen input processing step and the pen input switching step. In the pen input processing step, the pen input processing section 102 acquires the contact position of the pen 30 on the screen DF of the display unit 14-1 that the touch sensor unit 33 detects and executes the pen-input processing by switching between the tablet screen input mode (the first pen input mode) for making the display unit 14-1 display the movement locus of the pen 30 on the screen DF of the display unit 14-1 which is based on the contact position of the pen 30 and the laptop PC screen input mode (the second pen input mode) for making the display unit 14-2 display the movement locus of the pen 30.

Thereby, it becomes possible for the controlling method according to the first embodiment of the present invention to exhibit the effects which are the same as the effects of the tablet terminal 1 and the information processing system 100 which are described above, to readily perform switching of the target screen for the pen input and thereby to improve the user experience.

Second Embodiment

Next, an information processing system 100a according to the second embodiment of the present invention will be described with reference to the drawing. In the second embodiment, a modified example that the pen input processing and the pen input switch processing are executed by a main control unit 10a-1 of a tablet terminal 1a will be described.

Figure 11:
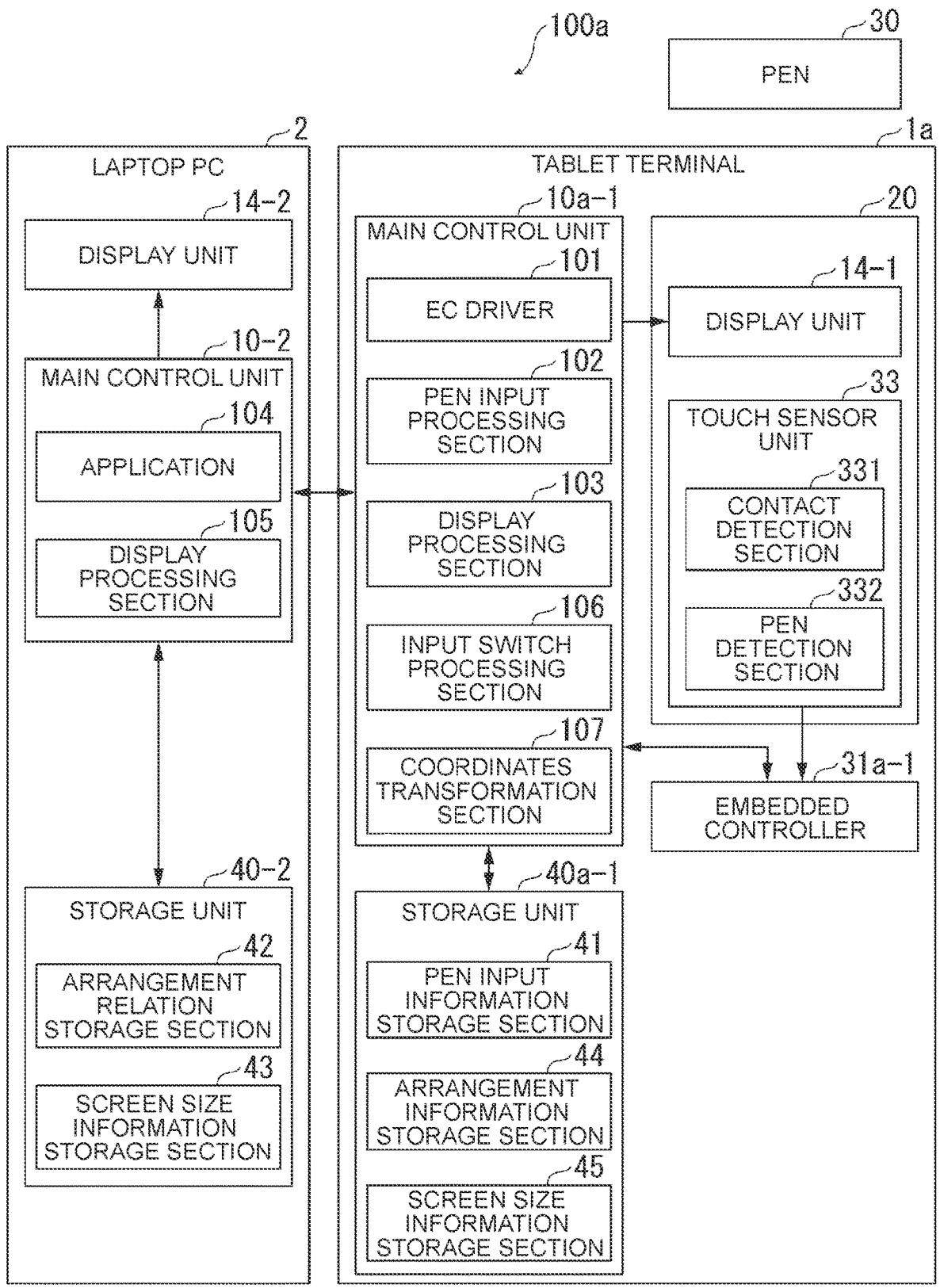
FIG. 11 is a block diagram illustrating one example of functional constitutional elements of an information processing system according to the second embodiment of the present invention.

FIG. 11 is a block diagram illustrating one example of functional constitutional elements of the information processing system 100a according to the second embodiment of the present invention.

Incidentally, since the external appearance and the hardware configuration of the tablet terminal 1a of the information processing system 100a according to the second embodiment of the present invention are the same as those of the tablet terminal 1 of the information processing system 100 according to the first embodiment which is illustrated in FIG. 1 and FIG. 2, the description thereof will be omitted here.

As illustrated in FIG. 11, the information processing system 100a includes the tablet terminal 1a, the laptop PC 2 and the open 30. In addition, the tablet terminal 1a includes the main control unit 10a-1, the touch screen 20, an embedded controller 31a-1 and a storage unit 40a-1. In addition, the laptop PC 2 includes the main control unit 10-2, the display unit 14-2 and the storage unit 40-2.

In FIG. 11, the symbols which are the same as those in FIG. 4 are assigned to the constitutional elements which are the same as those in FIG. 4 and the description thereof will be omitted. In the second embodiment, the embedded controller 31a-1 does not include the arrangement information storage section 311, the screen size information storage section 312, the input switch processing section 313 and the coordinates transformation section 314, and the storage unit 40a-1 includes the arrangement information storage section 311 and the screen size information storage section 312, and the main control unit 10a-1 includes the input switch processing section 313 and the coordinates transformation section 314.

The storage unit 40a-1 is realized by, for example, the main memory 12 or the SSD 23 of the tablet terminal 1a and stores various information such as, for example, the pen input information and so forth. The storage unit 40a-1 includes the pen input information storage section 41, the arrangement information storage section 44 and the screen size information storage section 45.

The arrangement information storage section 44 is realized by the main memory 12 or the SSD 23 of the tablet terminal 1a and stores the arrangement information which indicates the arrangement relation between the screen DF of the display unit 14-1 and the screen of the display unit 14-2. Since the configuration of the arrangement information storage section 44 is the same as the configuration of the arrangement information storage section 311 and therefore the description thereof will be omitted here. That is, the arrangement information storage section 44 has the data configuration which is the same as the data configuration in FIG. 5.

The screen size information storage section 45 is realized by the main memory 12 or the SSD 23 of the tablet terminal 1a and stores the screen size information which is received from the main control unit 10-2 of the laptop PC 2. Since the configuration of the screen size information storage section 45 is the same as the configuration of the screen size information storage section 312, the description of the configuration will be omitted here.

The main control unit 10a-1 is a functional unit which is realized by executing the program that the main memory 12 of the tablet terminal 1a stores by the CPU 11 and the chipset 21 of the tablet terminal 1a and executes various OS-based processing. The main control unit 10a-1 executes control processing which makes the tablet terminal 1a function as an extended pen tablet. In addition, the main control unit 10a-1 includes, for example, the EC driver 101, the pen input processing section 102, the display processing section 103, an input switch processing section 106 and a coordinates transformation section 107.

The input switch processing section 106 is a functional section which is realized by executing the program that the main memory 12 of the tablet terminal 1a stores by the CPU 11 and the chipset 21 of the tablet terminal 1a and switches between the tablet screen input mode and the laptop PC screen input mode alternately in accordance with the operation of hovering swipe-out. Since the input switch processing section 106 executes the processing which is the same as the processing that the input switch processing section 313 executes, description of the processing will be omitted here.

The coordinates transformation section 107 is a functional section which is realized by executing the program that the main memory 12 of the tablet terminal 1a stores by the CPU 11 and the chipset 21 of the tablet terminal 1a and transforms the coordinates of the pen 30 on the screen DF of the display unit 14-1 to the coordinates of the pen 30 on the screen of the display unit 14-2 on the basis of the screen size information that the screen size information storage section 45 stores. Since the coordinates transformation section 107 executes the processing which is the same as the processing that the coordinates transformation section 314 executes, the description of the processing will be omitted here.

Next, the operation of the information processing system 100*a* according to the second embodiment of the present invention will be described with reference to the drawing.

Here, the concrete example of the operation of the information processing system 100*a* according to the second embodiment of the present invention will be described with reference to FIG. 12.

Figure 12:
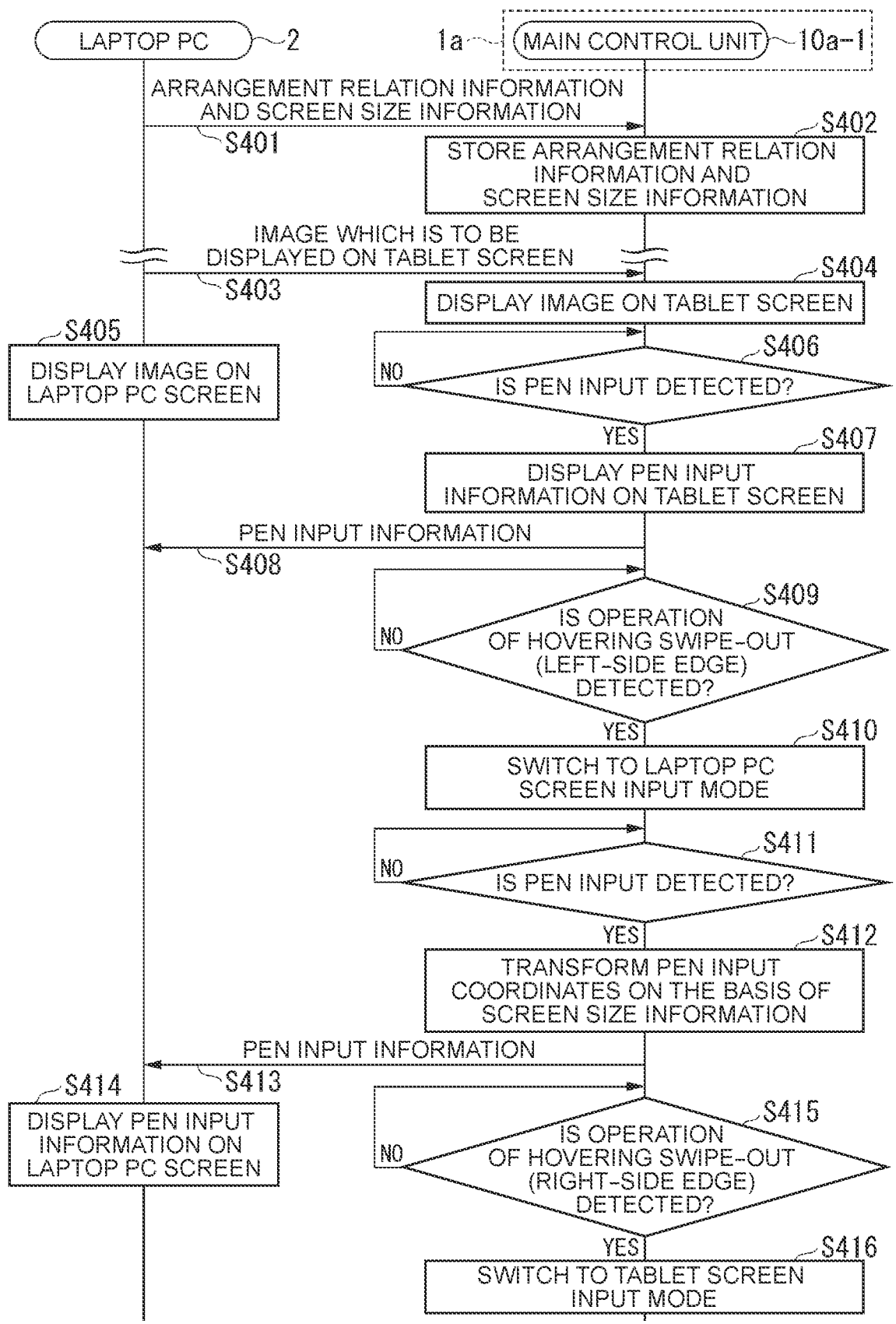
FIG. 12 is a flowchart illustrating one example of an operation of the information processing system according to the second embodiment of the present invention.

FIG. 12 is a flowchart illustrating one example of the operation of the information processing system 100*a* according to the second embodiment of the present invention. Here, one example of processing of setting the arrangement relation information and the screen size information and one example of processing of switching from the tablet screen input mode to the laptop PC screen input mode and then again switching to the tablet screen input mode will be described.

In FIG. 12, first, the laptop PC 2 transmits the arrangement relation information which is the monitor screen setting information and the information on the screen size of the display unit 14-2 to the main control unit 10*a*-1 of the tablet terminal 1*a* (step S401). The main control unit 10-2 of the laptop PC 2 transmits the arrangement relation information and the screen size information to the main control unit 10*a*-1.

Next, the main control unit 10*a*-1 stores the arrangement relation information and the screen size information (step S402). The main control unit 10*a*-1 makes the arrangement information storage section 44 store the arrangement information of the type which is based on the received arrangement relation information and which is illustrated, for example, in FIG. 5. In addition, the main control unit 10*a*-1 makes the screen size information storage section 45 store the received screen size information.

Since processes which are executed in the following step S403 to step S405 are the same as the processes which are executed in step S304 to step S306 which are illustrated in FIG. 10, description of these processes will be omitted here.

Next, the main control unit 10*a*-1 decides whether the pen input is detected (step S406). The main control unit 10*a*-1 decides whether the pen input is detected by the contact detection section 331 and the pen detection section 332 of the touch sensor unit 33 via the embedded controller 31*a*-1. In a case where the pen input is detected (step S406: YES), the main control unit 10*a*-1 proceeds the process to step S407. On the other hand, in a case where the pen input is not detected (step S406: NO), the main control unit 10*a*-1 returns the process to step S406.

In step S407, the main control unit 10*a*-1 displays the pen input information on the tablet screen. As processing to be executed in the tablet screen input mode, the pen input processing section 102 of the main control unit 10*a*-1 makes the display unit 14-1 display the pen input information (the movement locus of the pen 30) which is received from the embedded controller 31*a*-1 via the EC driver 101, via the display processing section 103.

Next, the pen input processing section 102 transmits the pen input information to the laptop PC 2 (step S408). The pen input information which is transmitted to the laptop PC 2 is utilized for, for example, processing of the application 104.

In addition, the main control unit 10*a*-1 decides whether the operation of hovering swipe-out (left-side edge) is detected (step S409). The main control unit 10*a*-1 decides whether the operation of hovering swipe-out (left-side edge) is detected by the pen detection section 332 of the touch sensor unit 33. In a case where the operation of hovering swipe-out (left-side edge) is detected (step S409: YES), the main control unit 10*a*-1 proceeds the process to step S410. On the other hand, in a case where the operation of hovering swipe-out (left-side edge) is not detected (step S409: NO), the main control unit 10*a*-1 returns the process to step S409.

In step S410, the main control unit 10*a*-1 switches to the laptop PC screen input mode. That is, the input switch processing section 106 of the main control unit 10*a*-1 switches to the laptop PC screen input mode on the basis of the arrangement information of the type that the arrangement information storage section 44 stores and which is illustrated, for example, in FIG. 5. Thereby, the pen input processing section 102 is switched from the tablet screen input mode to the laptop PC screen input mode.

In addition, the main control unit 10*a*-1 decides whether the pen input is detected (step S411). The main control unit 10*a*-1 decides whether the pen input is detected by the contact detection section 331 and the pen detection section 332 of the touch sensor unit 33 via the embedded controller 31*a*-1. In a case where the pen input is detected (step S411: YES), the main control unit 10*a*-1 proceeds the process to step S412. On the other hand, in a case where the pen input is not detected (step S411: NO), the main control unit 10*a*-1 returns the process to step S411.

In step S412, the main control unit 10*a*-1 transforms the pen input coordinates on the basis of the screen size information. That is, the coordinates transformation section 107 of the main control unit 10*a*-1 transforms the pen input coordinates which are detected by the contact detection section 331 and the pen detection section 332 of the touch sensor unit 33 to the pen input coordinates which conforms to the size of the screen of the display unit 14-2 on the basis of the screen size information that the screen size information storage section 45 stores.

Next, the main control unit 10*a*-1 transmits the pen input information which is based on the transformed pen input coordinates to the laptop PC 2 (step S413). That is, the pen input processing section 102 of the main control unit 10*a*-1 transmits the pen input information (the movement locus of the pen 30) which is based on the pen input coordinates that the coordinates transformation section 107 transforms to the laptop PC 2.

Next, the laptop PC 2 displays the pen input information on the laptop PC screen (step S414). The main control unit 10-2 of the laptop PC 2 makes the display unit 14-2 display the received pen input information (the movement locus of the pen 30) via the display processing section 105.

In addition, the main control unit 10*a*-1 decides whether the operation of hovering swipe-out (the right-side edge) is detected (step S415). In a case where the operation of hovering swipe-out (the right-side edge) is detected (step S415: YES), the main control unit 10*a*-1 proceeds the process to step S416. On the other hand, in a case where the operation of hovering swipe-out (the right-side edge) is not detected (step S415: NO), the main control unit 10*a*-1 returns the process to step S415.

In step S416, the main control unit 10*a*-1 switches to the tablet screen input mode. That is, the input switch processing section 106 of the main control unit 10*a*-1 switches to the tablet screen input mode on the basis the arrangement information of the type that the arrangement information storage section 44 stores and which is illustrated in, for example, FIG. 5. Thereby, the pen input processing section 102 of the main control unit 10a-1 is switched from the laptop PC screen input mode to the tablet screen input mode.

As described above, the tablet terminal 1a according to the second embodiment of the present invention includes the display unit 14-1, the touch sensor unit 33 and the main control unit 10a-1. The main control unit 10a-1 includes the pen input processing section 102, the input switch processing section 106 and the coordinates transformation section 107.

Thereby, it becomes possible for the tablet terminal 1a and the information processing system 100a according to the second embodiment to exhibit the effects which are the same as the effects of the tablet terminal 1 and the information processing system 100 according to the first embodiment, to readily perform switching of the target screen for the pen input and to improve the user experience.

Incidentally, the tablet terminal 1a according to the second embodiment of the present invention may be also in the form that the embedded controller 31a-1 is not installed. In this case, the tablet terminal 1a may be also configured to transmit detection of the pen 30 and detection of the touch directly from the touch sensor unit 33 to the main control unit 10a-1.

Third Embodiment

Next, an information processing system 100b according to the third embodiment of the present invention will be described with reference to the drawings. In the third embodiment, a modified example that the pen input processing and the pen input switch processing are executed by a main control unit (main controller) 10a-2 of a laptop PC 2a will be described.

Figure 13:
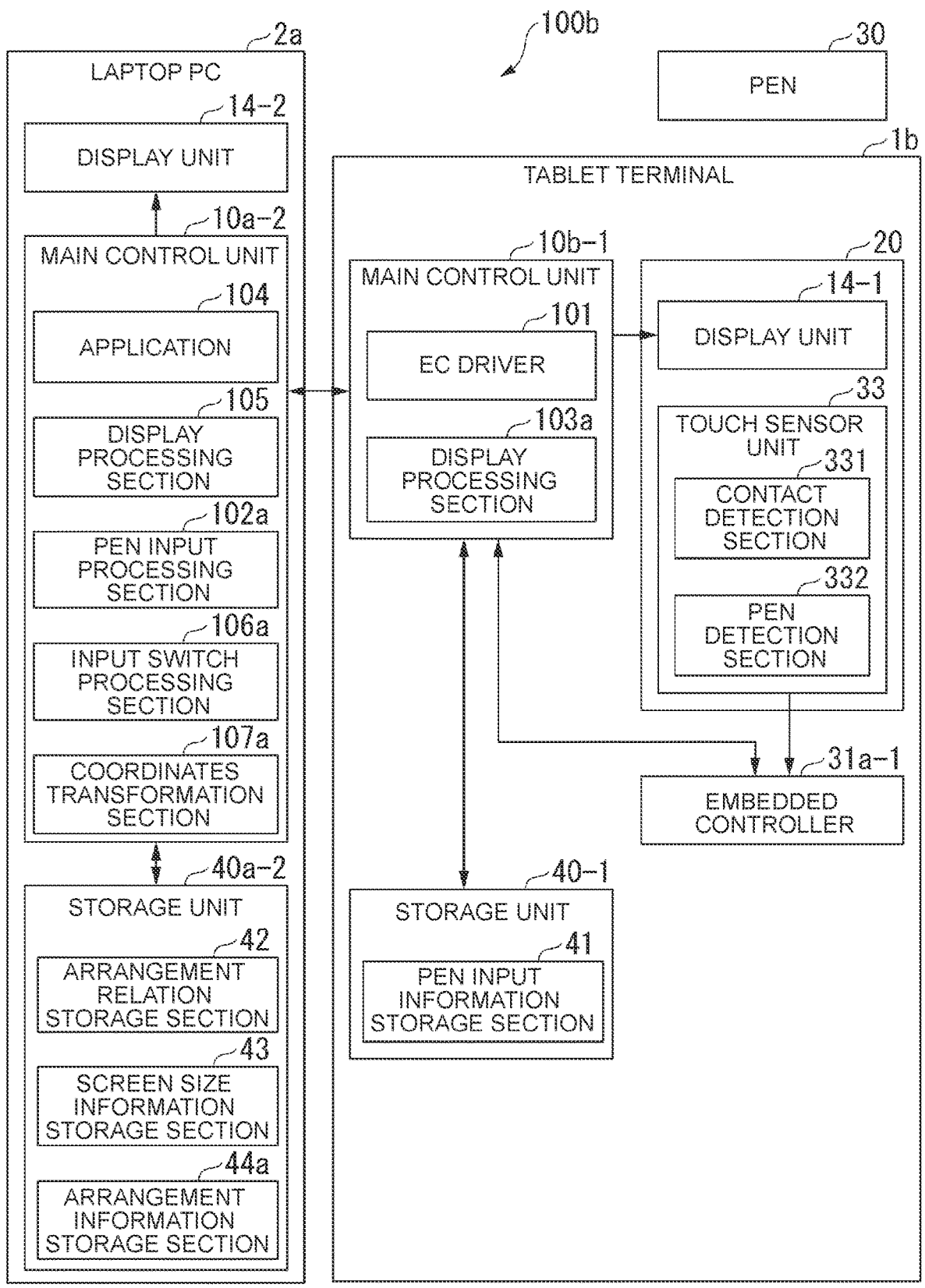
FIG. 13 is a block diagram illustrating one example of functional constitutional elements of an information processing system according to the third embodiment of the present invention.

FIG. 13 is a block diagram illustrating one example of functional constitutional elements of the information processing system 100b according to the third embodiment of the present invention.

Incidentally, since outer appearances and hardware configurations of a tablet terminal 1b and the laptop PC 2a of the information processing system 100b according to the third embodiment of the present invention are the same as the outer appearances and the hardware configurations of the tablet terminal 1 and the laptop PC 2 in the first embodiment which is illustrated in FIG. 1, FIG. 2 and FIG. 3, description thereof will be omitted here.

As illustrated in FIG. 13, the information processing system 100b includes the tablet terminal 1b, the laptop PC 2a and the pen 30. In addition, the tablet terminal 1b includes a main control unit (main controller) 10b-1, the touch screen 20, the embedded controller 31a-1 and the storage unit 40-1. In addition, the laptop PC 2a includes the main control unit 10a-2, the display unit 14-2 and a storage unit (storage) 40a-2.

In FIG. 13, the description of the constitutional elements which are the same as those in FIG. 4 or FIG. 11 will be omitted by assigning the same symbols thereto.

The main control unit 10b-1 is a functional unit which is realized by executing the program that the main memory 12 of the tablet terminal 1b stores by the CPU 11 and the chipset 21 of the tablet terminal 1b and executes various OS-based processing. The main control unit 10b-1 executes control processing for making the tablet terminal 1b function as an extended pen tablet. The main control unit 10b-1 acquires detection data which is detected by the contact detection section 331 and the pen detection section 332 of the touch sensor unit 33 via the embedded controller 31a and transmits the acquired detection data to the laptop PC 2a.

In addition, the main control unit 10b-1 includes, for example, the EC driver 101 and a display processing section 103a.

The display processing section 103a is a functional section which is realized by executing the program that the main memory 12 of the tablet terminal 1b stores by the CPU 11 and the chipset 21 of the tablet terminal 1b. The display processing section 103a makes the display unit 14-1 display an image and pen input information (the movement locus of the pen 30) which are so received from the laptop PC 2a as to be displayed on the tablet screen.

The laptop PC 2a includes the main control unit 10a-2, the display unit 14-2 and the storage unit 40a-2.

The storage unit 40a-2 is realized by, for example, the main memory 12 or the SSD 23 of the laptop PC 2a and stores various kinds of information such as, for example, information which indicates the arrangement relation between the display unit 14-1 and the display unit 14-2, the screen size of the display unit 14-2 and so forth. The storage unit 40a-2 includes the arrangement relation storage section 42, the screen size information storage section 43 and an arrangement information storage section 44a.

The arrangement information storage section 44a is realized by the main memory 12 or the SSD 23 of the laptop PC 2a and stores arrangement information which indicates the arrangement relation between the screen DF of the display unit 14-1 and the screen of the display unit 14-2. The arrangement information storage section 44a has the configuration which is the same as the configuration of the arrangement information storage section 311 and therefore the description thereof will be omitted here. That is, the arrangement information storage section 44a stores data of a configuration which is the same as the configuration of the data which is illustrated in FIG. 5.

The main control unit 10a-2 is a functional unit which is realized by executing the program that the main memory 12 of the laptop PC 2a stores by the CPU 11 and the chipset 21 of the laptop PC 2a and executes various OS-based processing. In a case where monitor arrangement setting information (the arrangement relation information) that the arrangement relation storage section 42 stores is change by, for example, a user, the main control unit 10a-2 changes the arrangement information which is stored in the arrangement information storage section 44a.

In addition, the main control unit 10a-2 executes pen input processing which is input by using the tablet terminal 1b.

In addition, the main control unit 10a-2 includes the application 104, the display processing section 105, a pen input processing section 102a, an input switch processing section 106a and a coordinates transformation section 107a.

The pen input processing section 102a is a functional section which is realized by executing the program that the main memory 12 of the laptop PC 2a stores by the CPU 11 and the chipset 21 of the laptop PC 2a and controls the pen input processing such as handwriting input and so forth which are performed by using the touch screen 20 and the pen 30. The pen input processing section 102a acquires the contact position of the pen 30 on the screen DF of the display unit 14-1 that the touch sensor unit 33 of the touch screen 20 detects and executes the pen input processing by switching between the input mode (the first pen input mode) of the tablet screen (the screen DF of the display unit 14-1) and the input mode (the second pen input mode) of the laptop PC screen (the screen of the display unit 14-2). The pen input processing section 102a executes the processing which is the same as the processing that the pen input processing section 102 executes and therefore the description of the processing will be omitted here.

The input switch processing section 106a is a functional section which is realized by executing the program that the main memory 12 of the laptop PC 2a stores by the CPU 11 and the chipset 21 of the laptop PC 2a and switches between the tablet screen input mode and the laptop PC screen input mode alternately in accordance with the operation of hovering swipe-out. The input switch processing section 106a executes the processing which is the same as the processing that the input switch processing section 106 executes and therefore the description of the processing will be omitted here.

The coordinates transformation section 107a is a functional section which is realized by executing the program that the main memory 12 of the laptop PC 2a stores by the CPU 11 and the chipset 21 of the laptop PC 2a and transforms the coordinates of the object (for example, the pen, the user's finger and so forth) on the display unit 14-1 to the coordinates of the object on the screen of the display unit 14-2 on the basis of the screen size information that the screen size information storage section 43 stores. The coordinates transformation section 107a executes the processing which is the same as the processing that the coordinates transformation section 107 executes and therefore the description of the processing will be omitted here.

Next, the operation of the information processing system 100b according to the third embodiment of the present invention will be described with reference to the drawing.

Here, a concrete example of the operation of the information processing system 100b according to the third embodiment of the present invention will be described with reference to FIG. 14.

Figure 14:
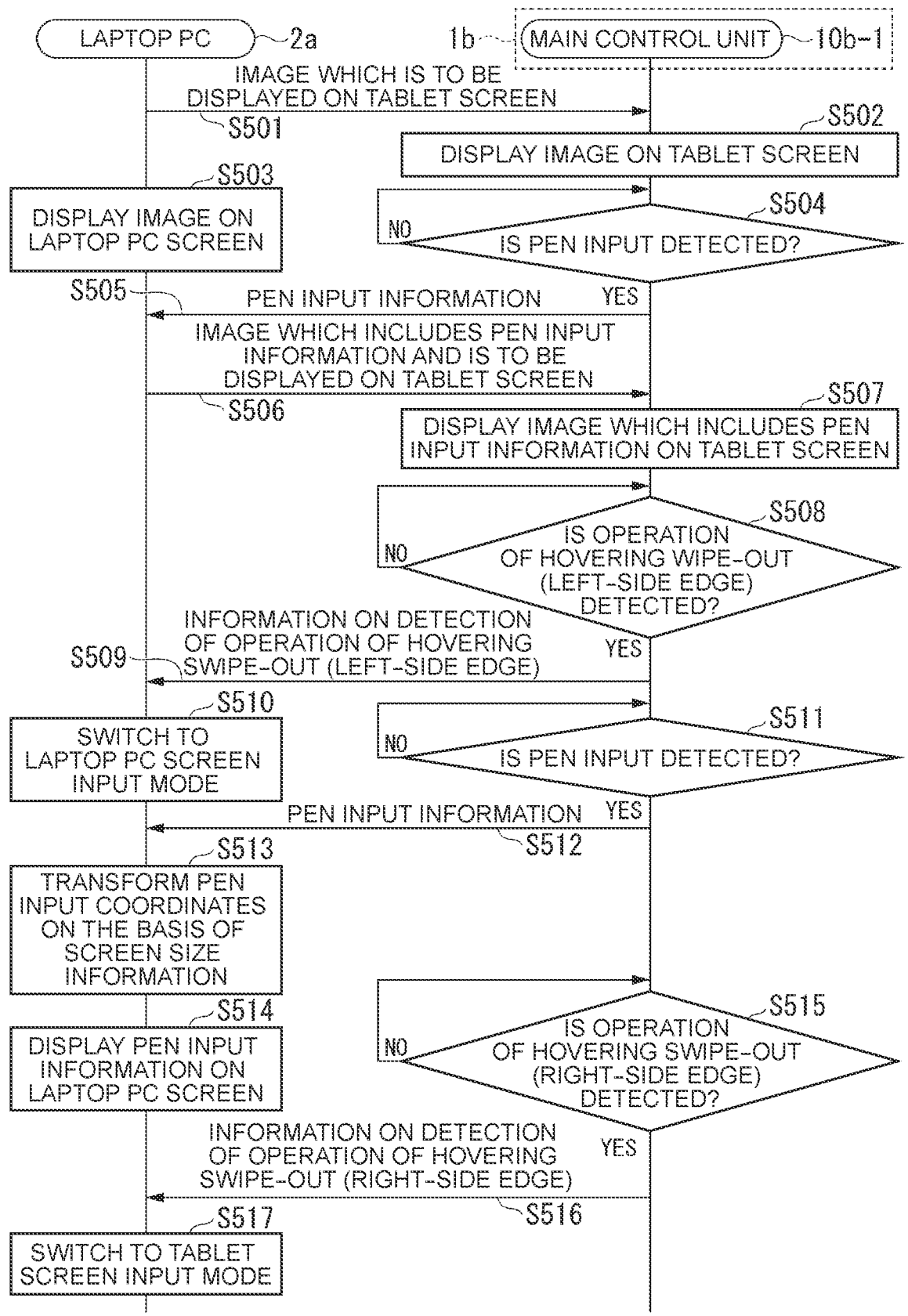
FIG. 14 is a flowchart illustrating one example of an operation of the information processing system according to the third embodiment of the present invention.

FIG. 14 is a flowchart illustrating one example of the operation of the information processing system 100b according to the third embodiment of the present invention. Here, one example of processing of switching from the tablet screen input mode to the laptop PC screen input mode The and then again switching to the tablet screen input mode will be described.

In FIG. 14, the processes from step S501 to step S503 are the same as the processes from step S403 to step S405 in FIG. 12 and therefore the description of these processes will be omitted here.

Next, the main control unit 10b-1 decides whether the pen input is detected (step S504). The main control unit 10b-1 decides whether the pen input is detected by the contact detection section 331 and the pen detection section 332 of the touch sensor unit 33 via the embedded controller 31a-1. In a case where the pen input is detected (step S504: YES), the main control unit 10b-1 proceeds the process to step S505. On the other hand, in a case where the pen input is not detected (step S504: NO), the main control unit 10b-1 returns the process to step S504.

In step S505, the main control unit 10b-1 transmits the pen input information to the laptop PC 2a. The pen input information which is transmitted to the laptop PC 2a is utilized in, for example, processing of the application 104.

Next, the laptop PC 2a transmits the image which includes the received pen input information and is to be displayed on the tablet screen to the main control unit 10b-1 of the tablet terminal 1b (step S506). The main control unit 10a-2 of the laptop PC 2a transmits the image which includes the pen input information (the movement locus of the pen 30) and which is to be displayed on the tablet screen to the main control unit 10b-1 of the tablet terminal 1b.

The main control unit 10b-1 displays the image which includes the pen input information and which is to be displayed on the tablet screen, on the tablet screen (step S507). As the processing which is executed in the tablet screen input mode, the pen input processing section 102a of the main control unit 10b-1 makes the display unit 14-1 display the image which includes the pen input information (the movement locus of the pen 30) which is received from the laptop PC 2a and which is to be displayed on the tablet screen.

In addition, the main control unit 10b-1 decides whether the operation of hovering swipe-out (the left-side edge) is detected (step S508). The main control unit 10b-1 decides whether the operation of hovering swipe-out (the left-side edge) is detected by the pen detection section 332 of the touch sensor unit 33. In a where the operation of hovering swipe-out (the left-side edge) is detected (step S508: YES), the main control unit 10b-1 proceeds the process to step S509. On the other hand, in a where the operation of hovering swipe-out (the left-side edge) is not detected (step S508: NO), the main control unit 10b-1 returns the process to step S508.

In step S509, the main control unit 10b-1 transmits information on detection of the operation of hovering swipe-out (the left-side edge) to the laptop PC 2a.

The laptop PC 2a switches to the laptop PC screen input mode (step S510). That is, the input switch processing section 106a of the main control unit 10a-2 switches to the laptop PC screen input mode on the basis of the arrangement information of the type that the arrangement information storage unit 44a stores and which is illustrated, for example, in FIG. 5. Thereby, the pen input processing section 102 is switched from the tablet screen input mode to the laptop PC screen input mode.

In addition, the main control unit 10b-1 decides whether the pen input is detected (step S511). The main control unit 10b-1 decides whether the pen input is detected by the contact detection section 331 and the pen detection section 332 of the touch sensor unit 33 via the embedded controller 31a-1. In a case where the pen input is detected (step S511: YES), the main control unit 10b-1 proceeds the process to step S512. On the other hand, in a case where the pen input is not detected (step S511: NO), the main control unit 10b-1 returns the process to step S511.

In step S512, the main control unit 10b-1 transmits the pen input information to the laptop PC 2a. The pen input information which is transmitted to the laptop PC 2a is utilized for processing of, for example, the application 104.

Next, the laptop PC 2a transforms the input coordinates of the pen 30 on the basis of the screen size information (step S513). That is, the coordinates transformation section 107a of the main control unit 10a-2 transforms the pen input coordinates which are detected by the contact detection section 331 and the pen detection section 332 of the touch sensor unit 33 to the pen input coordinates which conforms to the size of the screen of the display unit 14-2 on the basis of the screen size information that the screen size information storage section 43 stores.

Next, the laptop PC 2a displays the image which includes the pen input information and is to be displayed on the laptop PC screen, on the laptop PC screen (step S514). The pen input processing section 102a of the main control unit 10a-2 makes the display unit 14-2 display the image which includes the pen input information (the movement locus of the pen 30) that the coordinates transformation section 107a transforms and which is displayed on the laptop PC screen as the processing which is to be executed in the laptop PC screen input mode.

In addition, the main control unit 10b-1 decides whether the operation of hovering swipe-out (the right-side edge) is detected (step S515). In a case where the operation of hovering swipe-out (the right-side edge) is detected (step S515: YES), the main control unit 10b-1 proceeds the process to step S516. On the other hand, in a case where the operation of hovering swipe-out (the right-side edge) is not detected (step S515: NO), the main control unit 10b-1 returns the process to step S515.

In step S516, the main control unit 10b-1 transmits information on detection of the operation of the hovering swipe-out (the right-side edge) to the laptop PC 2a.

The laptop PC 2a switches to the tablet screen input mode (step S517). That is, the input switch processing section 106a of the main control unit 10a-2 switches to the tablet screen input mode on the basis of the arrangement information of the type that the arrangement information storage section 44a stores and which is illustrated, for example, in FIG. 5. Thereby, the pen input processing section 102a is switched from the laptop PC screen input mode to the tablet screen input mode.

As described above, the information processing system 100b according to the third embodiment of the present invention includes the tablet terminal 1b and the laptop PC 2a. The laptop PC 2a (the information processing device) includes the display unit 14-2 and the main control unit 10a-2. The main control unit 10a-2 includes the pen input processing section 102a, the input switch processing section 106a and the coordinates transformation section 107a.

Thereby, it becomes possible for the information processing system 100b according to the third embodiment to exhibit the effects which are the same as the effects of the information processing systems 100 and 100a according to the first and second embodiments of the present invention, to readily perform switching of the pen input target screen and to improve the user experience.

Incidentally, the present invention is not limited to the above-described respective embodiments and may be altered in a variety of ways within the range not deviating from the gist of the present invention.

For example, although in each of the above-described respective embodiments, the example that the information processing device is the tablet terminal 1 (1a, 1b) is described, the information processing device is not limited to the tablet terminal and may be information processing devices of other types such as, for example, a laptop PC, a smartphone and so forth. In addition, the laptop PC 2 (2a) may be a desktop PC.

In addition, although in each of the first and second embodiments, the example that the laptop PC 2 (2a) generates the image which is to be displayed on the display unit 14-1 and the display unit 14-2 on the basis of the application 104 is described, the tablet terminal 1 (1a) may be so configured as to generate the image which is to be displayed on the display unit 14-1 and the display unit 14-2. In this case, the information processing system 100 (100a) may be so configured as to include a display device such as, for example, a mobile monitor and so forth in place of the laptop PC 2 (2a).

In addition, in the third embodiment, the information processing system 100b may be so configured as to build the touch screen 20 which includes the display unit 14-1 and the touch sensor unit 33 and the display unit 14-2 therein, instead of connecting the tablet terminal 1b to the information processing system 100b.

In addition, although in each of the embodiments, the example that the OS of the tablet terminal 1 (1a, 1b) and the laptop PC 2 (2a) is Windows is described, the OS is not limited to Windows and other OSs such as Android (the registered trademark) and others may be also applied.

Incidentally, each constitutional element that the information system 100 (100a, 100b) includes has a computer system which is built therein. Then, the processing in each constitutional element that the information processing system 100 (100a, 100b) includes may be performed by recording a program for realizing the function of each constitutional element that the information processing system 100 (100a, 100b) includes into a computer-readable recording medium, making the computer system read in the program which is recorded in the recording medium and executing the program. Here "making the computer system read in the program which is recorded in the recording medium and executing the program" includes to install the program into the computer system. Here, "the computer system" shall include the OS and hardware such as peripherals and so forth.

In addition, the "computer system" may also include a plurality of computer devices which is mutually connected over a network which includes communication lines such as the Internet, WAN (Wide Area Network), LAN (Local Area Network), a leased line and so forth. In addition, the "computer-readable recording medium" means a portable medium such as a flexible disc, a magneto-optical disc, a ROM (Read Only Memory), a CD-ROM (Compact Disc-ROM) and so forth and a storage device which is built in each computer system such as a hard disc and so forth. As described above, the recording medium which stores the program may be also a non-transitory computer-readable recording medium such as the CD-ROM and so forth.

In addition, also an internally or externally installed recording medium which is accessible from a distribution server for distribution of the program concerned is included in the recording medium. Incidentally, a configuration that one program is divided into a plurality of partial programs and these partial programs are downloaded at mutually different timings and then the partial programs are mutually combined by the respective constitutional elements that the information processing system 100 (100a, 100b) includes may be also made and distribution servers which distribute the divided partial programs respectively may be different from one another. Further, "the computer readable recording medium" shall also include a medium of the type of holding the program for a definite period of time such as a server which works in this way in a case where the program is transmitted to the server over the network and a volatile memory (a RAM (Random Access Memory)) which is built in each computer system which serves as a client. In addition, the program may be of the type of realizing some of the above-described functions. Further, the program may be of the type of making it possible to realize the above-described functions by combination with a program which is recorded in advance in each computer system, that is, may be also a so-called differential file (a differential program).

In addition, some of or all the functions which are described above may be realized in the form of an integrated circuit such as an LSI (Large Scale Integration) and so forth. The respective functions may be processorized individually and/or some of or all the functions may be mutually integrated and then processorized. In addition, a technique of circuit integration may be realized by a private circuit or a general-purpose processor, not limited to the LSI. In addition, in a case where a novel circuit integration technology which realizes an integrated circuit which will take the place of the existing LSI emerges owing to advancement of the semiconductor technology, the integrated circuit which is realized by the novel technology may be also used.

DESCRIPTION OF SYMBOLS 1, 1a, 1b tablet terminal
2, 2a laptop PC
10, 10-1, 10-2, 10a-1, 10a-2, 10b-1 main control unit
11 CPU
12 main memory
13 video subsystem
14, 14-1, 14-2 display unit
20 touch screen
21 chipset
22 BIOS memory
23 HDD
24 USB connecter
25 audio system
26 WLAN card
30 pen
31, 31-1, 31a-1, 31-2, embedded controller
32 input unit
33 touch sensor unit
34 power source circuit
35 sensor unit
40-1, 40-2, 40a-1 storage unit
41 pen input information storage section
42 arrangement relation storage section
44, 44a, 311 arrangement information storage section
43, 45, 312 screen size information storage section
100, 100a, 100b information processing system
101 EC driver
102, 102a pen input processing section
103, 103a, 105 display processing section
104 application
106, 106a, 313 input switch processing section
107, 107a, 314 coordinates transformation section
331 contact detection section
332 pen detection section
DF screen
LC 1 resonance circuit

What is claimed:
1. An information processing device comprising:
a first display;
a touch sensor which is arranged on a screen of the first display and which detects a contact position of an object on the screen, and detects approach of a pen which approaches a point which is located within a threshold distance above the screen of the first display in a state that the pen is out of contact with the screen and the position of the pen above the screen;
a pen input processing section which acquires a contact position of the pen on the screen of the first display that the touch sensor detects and executes pen input processing by switching between a first pen input mode for displaying a movement locus of the pen on the screen of the first display which is based on the contact position of the pen and a second pen input mode for displaying the movement locus of the pen on a second display which is set to a specific arrangement relation with the first display; and an input switch processing section which switches between the first pen input mode and the second pen input mode alternately in accordance with a movement operation of the pen which is performed in a non-contact state which is based on the specific arrangement relation after detection of approach of the pen by the touch sensor.

2. The information processing device according to claim 1 further comprising:
an arrangement information storage section which stores arrangement information which indicates an arrangement relation between the first display and the second display, wherein
in a case where a hovering state that the pen maintains a state of out-of-contact with the screen of the first display and a state of approaching the point which is located within the threshold distance for a fixed time period is detected by the touch sensor and thereafter an operation of moving the pen above the screen of the first display in a direction of indicating a switching destination screen is detected on the basis of the arrangement information, the input switching processing section switches to one input mode which corresponds to the screen of the switching destination between the first input mode and the second input mode.

3. The information processing device according to claim 1, further comprising:
a screen size information storage section which stores screen size information which indicates the size of the screen of the second display; and
a coordinates transformation section which transforms coordinates of the pen on the screen of the first display to coordinates of the pen on the screen of the second display on the basis of the screen size information that the screen size information storage section stores, wherein
the pen input processing section makes the second display displays the movement locus of the pen which is based on the coordinates of the pen on the screen of the second display that the coordinates transformation section transforms in the second pen input mode.

4. The information processing device according to the claim 3, further comprising:
a main control which executes processing which is based on an OS (Operating System); and
an independent built-in control which is different from the main control, wherein
the main control includes the pen input processing section and
the built-in control includes the input switch processing section and the coordinates transformation section.

5. An information processing system comprising:
a first display;
a touch sensor which is arranged on a screen of the first display and which detects a contact position of an object on the screen, and detects approach of a pen which approaches a point which is located within a threshold distance above the screen of the first display in a state that the pen is out of contact with the screen and the position of the pen above the screen;
a second display which is set to a specific arrangement relation with the first display;
a pen input processing section which acquires a contact position of the pen on the screen of the first display that the touch sensor detects and executes pen input processing by switching between a first pen input mode for making the first display displays a movement locus of the pen on the screen of the first display which is based on the contact position of the pen and a second pen input mode for making the second display displays the movement locus of the pen; and an input switch processing section which switches between the first pen input mode and the second pen input mode alternately in accordance with a movement operation of the pen which is performed in a non-contact state which is based on the specific arrangement relation after detection of approach of the pen by the touch sensor.

6. A method of controlling an information processing system which includes a first display, a touch sensor which is arranged on a screen of the first display and which detects a contact position of an object on the screen, and detects approach of a pen which approaches a point which is located within a threshold distance above the screen of the first display in a state that the pen is out of contact with the screen and the position of the pen above the screen and a second display which is set to a specific arrangement relation with the first display, comprising:

acquiring a contact position of the pen on the screen of the first display that the touch sensor detects and executing pen-input processing by switching between a first pen input mode for displaying a movement locus of the pen on the screen of the first display which is based on the contact position of the pen and a second pen input mode for making the second display displays the movement locus of the pen by a pen input processing section; and after detection of approach of the pen by the touch sensor, switching between the first pen input mode and the second pen input mode alternately in accordance with a movement operation of the pen which is performed in a non-contact state which is based on the specific arrangement relation by an input switch processing section.

* * * * *